United States Patent [19]

Rutkowski et al.

[11] Patent Number: 5,826,270
[45] Date of Patent: Oct. 20, 1998

[54] METHODS AND SYSTEMS FOR CLIENT OR CUSTOMER-SITE TRANSACTION PROCESSING IN A DISTRIBUTED DATABASE SYSTEM

[75] Inventors: Steve Rutkowski, Aurora; William Rierden, Evergreen, both of Colo.

[73] Assignee: CSG Systems, Inc., Englewood, Colo.

[21] Appl. No.: 580,160

[22] Filed: Dec. 28, 1995

[51] Int. Cl.[6] ................................................... G06F 17/30
[52] U.S. Cl. ....................... 707/10; 707/104; 340/825.03
[58] Field of Search ......................................... 340/825.03

[56] References Cited

U.S. PATENT DOCUMENTS

| | | | |
|---|---|---|---|
| 4,651,279 | 3/1987 | Suzuki | 705/18 |
| 4,694,396 | 9/1987 | Weisshaar et al. | 395/200.3 |
| 4,714,996 | 12/1987 | Gladney et al. | |
| 4,853,843 | 8/1989 | Ecklund | |
| 4,864,497 | 9/1989 | Lowry et al. | 707/102 |
| 4,882,674 | 11/1989 | Quint et al. | 395/684 |
| 5,230,072 | 7/1993 | Smith et al. | 707/4 |
| 5,263,165 | 11/1993 | Janis | 711/163 |
| 5,274,806 | 12/1993 | Hill | 707/10 |
| 5,289,371 | 2/1994 | Abel et al. | 703/103 |
| 5,325,290 | 6/1994 | Cauffman et al. | |
| 5,351,276 | 9/1994 | Doll, Jr. et al. | 379/67 |
| 5,361,091 | 11/1994 | Hoarty et al. | 348/7 |
| 5,404,523 | 4/1995 | DellaFera et al. | |
| 5,414,812 | 5/1995 | Filip et al. | 707/103 |
| 5,452,430 | 9/1995 | Dievendorff et al. | 395/183.13 |
| 5,452,450 | 9/1995 | Delory | 707/10 |
| 5,459,860 | 10/1995 | Burnett et al. | 707/101 |
| 5,463,774 | 10/1995 | Jenness | |
| 5,555,346 | 9/1996 | Gross | 395/51 |
| 5,678,042 | 10/1997 | Pisello | 395/200.54 |
| 5,695,607 | 12/1997 | Pisello | 707/10 |

*Primary Examiner*—Thomas G. Black
*Assistant Examiner*—Diane D. Mizrahi
*Attorney, Agent, or Firm*—Baker & McKenzie

[57] ABSTRACT

A distributed database system for processing a client or customer-site initiated on-line database transaction includes a transaction keying and RF transmitting device and a transaction RF transmission relay device for transmitting the client or customer-site initiated on-line database transaction, a local order RF receiver-convertor for receiving the transaction and converting the transaction to a computer readable format, and a modem for data linking the transaction to a persistent queue, which initiates a database transaction, including information identifying service location equipment and a desired product, and transmits the transaction to the queue. A client message server retrieves the transaction from the queue and transmits the transaction to a data directory server, including a rules database, and the data directory server interrogates at least one of a plurality of dispatch utility servers to identify an available dispatch utility server and routes the transaction to the available dispatch utility server. The available dispatch utility server extracts the information identifying the service location equipment and the product from the transaction, formulates an addressability change remote procedure call (RPC), and transmits the RPC to the data directory server. The data directory server then transmits the RPC to an addressability open server, and the addressability open server identifies the controller, which controls enabling and disabling the desired product, and instructs the controller to update the status of the product.

23 Claims, 7 Drawing Sheets

SERVER A

| CUSTOMER | CUSTOMER | PRODUCT | PROMOTION |
|---|---|---|---|
| 100014<br>SMITH, JOE R.<br>070465<br>1244 CHERRY DR.<br>NEWTON<br>MASSACHUSETTS<br>6174336633<br>BAS, HBO, SHO<br>$33.45<br>PPV (1a) $10.45<br>BOS34A | 100017<br>PURCELL, RED L.<br>093054<br>17 ELM STREET<br>TUCSON<br>ARIZONA<br>6023459876<br>DLX, ESPN<br>29.86<br>AZ67E | HBO<br>$10.95<br>BOS34A | ESPN<br>INSTALL FREE<br>ORDER BY 3/10/95<br>AZ67E |

SERVER B

| CUSTOMER | CUSTOMER | PRODUCT | PROMOTION |
|---|---|---|---|
| 200028<br>PETERS, EDWARD<br>030938<br>467 CHARLES AVE.<br>PENNINGTON<br>TEXAS<br>2148974530<br>BAS<br>$10.49<br>TEX29P | 200041<br>ADAMS, STAN L.<br>111249<br>612A Pine Rd.<br>Denver<br>Colorado<br>3034119000<br>SUP, VH1<br>$19.99<br>CO11P | HBO<br>$10.95<br>BOS34A | ESPN<br>INSTALL FREE<br>ORDER BY 3/10/95<br>AZ67E |

SERVER C

| CUSTOMER | CUSTOMER | PRODUCT | PROMOTION |
|---|---|---|---|
| 400067<br>REDMOND, JOE T.<br>012161<br>21 COLUMBIA AVE.<br>WASHINGTON<br>DISTRICT OF COLUMBIA<br>2026780101<br>DLX, CIN, SHO<br>$41.45<br>DCR45A | 400098<br>FRIAR, TUCKER P.<br>082163<br>13 MOCKING LANE<br>TUCSON<br>ARIZONA<br>6025601234<br>BAS, SPC<br>$21.98<br>AZ67E | HBO<br>$10.95<br>BOS34A | ESPN<br>INSTALL FREE<br>ORDER BY 3/10/95<br>AZ67E |

FIG. 6

METHODS AND SYSTEMS FOR CLIENT OR CUSTOMER-SITE TRANSACTION PROCESSING IN A DISTRIBUTED DATABASE SYSTEM

BACKGROUND OF THE INVENTION

1. Field of the Invention

The present invention relates to methods and systems for client or customer-site processing of transactions in a distributed database system.

2. Description of Related Art

The popularity of cable television has grown rapidly over the past two decades. This popularity has been driven in part by the improved reception quality offered by cable systems. Perhaps, more important to the success and growth of cable television, however, has been the increased variety of programming available to consumers.

Cable television may be sold as a basic package of channels, which may then be augmented by additional channels or subpackages of channels, e.g., premium packages containing one or more additional channels. Generally, the sale of such packages of channels does not rely on direct personal contact between a salesperson and a potential subscriber. Initial cable subscriptions may result from exposure to cable television at a relative's home or the home of an acquaintance. The subscriber usually solicits a basic package from his or her local cable television provider. The premium packages may also be sold in this manner or they may be also sold through advertisements on the channels of the basic package or through direct mailings to current subscribers, such as through promotional materials included with billing statements, and to past subscribers.

Nevertheless, an effective method of marketing the channels of the premium packages may be during promotional offerings, i.e., particular days, weekends, or portions of weekends during which free program viewing time is offered. These provide the opportunity for basic package subscribers to preview available programming. Frequently, these promotions include the opportunity for non-subscribers to subscribe to a premium channel at a reduced or introductory rate during the promotional period. Regardless of the marketing method, however, orders for cable television products or packages are commonly placed by preparing a paper order form, which is then manually processed. Such forms may be prepared by a cable television technician during an installation or maintenance visit or by telephone operator at a local cable television office.

In addition to the basic and premium packages described above, there is an ever growing market for the purchase of cable television access to individual events, e.g., boxing matches, movies, and the like. These "pay-per-view" options allow subscribers to tailor their cable television subscriber to their particular viewing desires. However, the increasing number of choices and options available to the cable television subscriber has also created a demand for increased flexibility in system design and increased speed and capacity for transaction processing.

With the increasing demand for the rapid processing of transactions, as well as the ever-increasing size of databases in which these transactions are processed, many cable television suppliers have turned to distributed database systems to satisfy this demand. As herein discussed, the term "distributed database" refers to a database system in which data may be located in more than one physical location or in more than one database, or both. In so me cases, data is distributed, such that certain data is located in only one database while other data is located in more than one database. Often, more than one client/customer or user needs to access the data at the same time. In addition, many requesters desire simultaneous or near simultaneous access. This presents a problem in that only a limited number of access requests may be processed at one time.

Access requests to databases generally are one of two types. The first is termed a "query" and is associated with a request to read data from a database or databases. The second is termed an "update" and is associated with a request to write data to a database or databases. For purposes of this discussion, both types of requests (and combinations thereof) are referred to generally as a "transaction." It is to be understood, however, that a transaction may involve one or more of either, or both, types of requests.

Various problems have been encountered with distributed database systems such as those described above. For example, in some cases, multiple requesters may request access to particular data at the same time. Typically, each data server may process one transaction (or a series of related transactions) at a time. Thus, if multiple transactions are delivered to one server, e.g., a collection of databases or a conduit to one or more databases, at the same time, not all of the transactions may be processed at the same time. When this occurs, the later transactions are queued or must be resubmitted. This causes undesirable delays in the processing of these transactions. Other factors also contribute to delays in processing such transactions. As a result, in some cases, one or more data servers may be idle while another is backlogged with multiple transactions. This is an inefficient use of resources.

In an attempt to address these problems, systems may employ a variety of different schemes in an effort to balance the distribution of transactions among multiple servers. According to one arrangement, particular requesters are permanently assigned to particular servers. The theory behind such a design is that by randomly limiting the number of requesters accessing a particular data server, some minimization of the "bottleneck" effect may be achieved. According to another approach, multiple copies of particular data are stored in more than one database. This reduces the likelihood that desired data will be unavailable.

These schemes, however, generally suffer from at least three drawbacks. First, if systems elect the first scheme, particular requesters are "hard-wired" to particular servers. In such systems, requesters do not have access to the full complement of servers available in the system, which are capable of processing a particular transaction. As a result, uneven load distribution still may occur, and a server, which is free to service a transaction, may not be called upon to do so because the requester may not have access to the free server. A second drawback to the data distribution schemes described above is the significant time and cost of processing information in order to determine the best method by which to allocate data transactions. In some cases, particularly when the number of transactions to be processed is low and the complexity of the allocation scheme is high, these systems may perform more efficiently without a real-time decisional process. Third, in the case of distributed database systems containing redundant data (e.g., the second scheme), the availability of secondary storage (e.g., disk storage) is significantly decreased by virtue of the redundancy of the data. Often, however, adequate data redundancy is not possible because of limitations in storage capacity imposed by a data storer/provider.

The cable television industry, and the telecommunications industry, in general, has a need for the ability and capacity to store and manipulate large amounts of data. Cable system operators typically maintain large databases containing a variety of subscriber, product, billing information, and the like. Typical classes of information managed by cable companies may include subscriber accounts, on-site equipment, and current and past selections, available products and their pricing structure, physical assets and their functionality, and marketing and promotion data. It is often desirable to distribute this information across a network of databases whether or not they are located at the same physical location.

The processing requirements for cable-based systems may be staggering. For example, it may be necessary to provide 24 hour a day service, 7 days per week, for a subscriber base including millions to tens of millions of subscribers. In addition, such a system may be called upon to execute hundreds or thousands of transactions per second (TPS). In addition, such systems may be called upon to support thousands of interactive requesters operating transaction generators (e.g., Customer Service Representatives (CSRs)) many of which may be concurrent requesters. Assuming about 15 million subscribers, it is further anticipated that the average customer record may soon be on the order of about 15 kilobytes requiring a total database capacity of about 225 gigabytes.

In an example of a distributed database system that may be employed by a cable system operator, a plurality of transaction generators or terminals may be operated by CSRs to acquire access to data contained within the system. Each of the transaction generators communicates either directly or indirectly through a communications controller with a particular associated server or group of servers. Communication techniques and protocols which are known in the art are employed to allow the transaction generators to communicate with these servers. For example, Ethernet™ may be used when both requester and server are PC-based processors.

In such systems, difficulties may arise when access to data residing at differing physical locations is required. This places a burden on the CSR (or the transaction generator, in general) because it may impose additional processing requirements to keep track of which data is accessible to a particular CSR and which is not. Additionally, if certain data is needed, but not accessible to a particular CSR, it may be necessary to determine where that data is located and which CSR may have access to it.

An example of such a system exhibiting the drawbacks described above may include four data processing centers to support a national cable system operator. Each of four geographical regions in the United States (e.g., Northeast, Southeast, Midwest, and West) may be supported by one of the four data processing centers. In such a case, all records for subscribers of the system operator who reside in Pennsylvania might be stored at the Northeast data center in its associated database. In the event that a particular Pennsylvania subscriber is at home and desires to change, i.e., enable or disable, a channel, event, or premium package. The subscriber may contact a CSR operating a transaction generator connected with the Northeast database. The CSR, using the transaction processor, may simply generate a request for information regarding that subscriber. Alternatively, the subscriber may contact an Automatic Response Unit (ARU) having an Automatic Number Indicator (ANI) interface and a similar request for information could be generated automatically.

The method of distribution of customer records in the above example is known as horizontal data distribution. In this example, each of the subscriber records is completely contained on one physical server while the whole of its associated database and the enterprise domain of all subscribers is spread across all servers. Such data may also be distributed in a vertical manner wherein different aspects of a subscriber's account resides on different physical servers.

SUMMARY OF THE INVENTION

A need has arisen for a distributed data base system capable of efficient, client or customer-site processing of data transactions. It is further desirable that the system be flexible, expandable, and cost efficient.

In addition, it is an object of the current invention to provide a distributed database system capable of high speed transaction processing. It is a yet further object of the invention to allow database access while eliminating the need for time consuming processes previously associated with such access. It is a still further object of the invention to provide server selection based upon a rules base allowing fast and efficient access to distributed information.

An embodiment of the invention is a distributed database system for processing a client or customer-site initiated on-line database transaction. The system comprises a transaction generator, which initiates at least one database transaction, including information identifying client or customer-site equipment and a desired product, and transmits the at least one transaction to a dispatcher means for tracking a geographic location of the generator, for routing each of the at least one transactions to a geographic system, and for queuing each of the at least one transactions within a queue, e.g., a persistent queue, and transaction transfer means for retrieving the at least one transaction from the queue and transmitting said at least one transaction to interrogation server means. The server interrogation means for interrogating data extraction means extracts the information identifying the client or customer-site equipment and the product from the transaction, formulates an addressability change transaction, and transmits the change transaction to the server interrogation means. The server interrogation means transmit the chance transaction to an addressability change means for identifying controller means for enabling and disabling the desired product, and for instructing the controller means to update the status of the product.

Another embodiment of the invention is a distributed database system for processing a client or customer-site, e.g., in-home, initiated on-line database transaction. The system may comprise a portable transaction generator, which initiates a database transaction, for example, by means of a remote procedure call (RPC), including information identifying client or customer-site equipment and a desired product, and transmits the transaction to a queue, e.g., a persistent queue. For example, the transaction generator may comprise a local order RF transmitter for transmitting the client or customer-site initiated on-line database transaction, a local order RF receiver-converter for receiving the transaction and converting the transaction to a computer readable format, and a modem for data linking the transaction to the queue. Further, the local order transmitter may include a transaction keying and RF transmitting device and a transaction RF transmission relay device. A client message server (CMS) retrieves the transaction from the queue and transmits the transaction to a data directory server (DDS). The DDS interrogates at least one of a plurality of dispatch utility servers (DUS) to identify an available DUS and routes the transaction to the available DUS. The available DUS extracts the information identifying the client or customer-site equipment and the product from the transaction, formulates an addressability change transaction, and transmits the change transaction to the DDS. The DDS then transmits the change transaction through an addressability open server. Finally, the addressability open server identifies a controller based on the identified client or customer-site equipment, which controls enabling and disabling the desired product, and instructs the controller to update the status of the product with respect to a particular client or customer.

The DDS may have access to or may include a rules database controlling the interrogation of the at least one of a plurality of DUSs by the DDS to identify the available DUS. Further, the plurality of DUSs may operate in parallel to process a plurality of the database transactions concurrently, and the plurality of DUSs also may operate in parallel to formulate a plurality of addressability change transactions, e.g., RPCs, concurrently. In addition, the system may include a plurality of controllers which may operate in parallel to process a plurality of database transactions concurrently and whereby an appropriate series of addressability change RPCs are formulated based on the client or customer-site equipment.

Still another embodiment of the invention is a method of processing client or customer-site initiated on-line data transactions. The method may comprise the steps of initiating a data transaction, including information identifying client or customer-site equipment and a desired product, at a client or customer-site and transmitting the transaction to a queue, e.g., a persistent queue. Such transactions may comprise RPCs. The transaction may later be retrieved from the queue, and the transaction then may be transmitted to a DDS. At least one of a plurality of DUSs is then interrogated by the DDS to identify an available DUS, and the transaction is routed to the available DUS. The information identifying the client or customer-site equipment and the desired product is next extracted from the data transaction, an addressability change transaction is formulated, and the change transaction is transmitted to an addressability open server. A controller is then identified, which controls enabling and disabling the desired product with respect to a particular client or customer, and the controller is instructed to enable or disable the product.

As noted above, the plurality of DUSs may operate in parallel to process a plurality of the database transactions concurrently and to formulate a plurality of the addressability change transactions concurrently. Further, the method may include the step of establishing rules whereby the interrogation of the at least one of a plurality of DUSs by the DDS to identify the available DUS is controlled. The method may also employ a plurality of controllers operating in parallel to process a plurality of the database transactions concurrently, and whereby an appropriate addressability change RPC may be formulated based on the client or customer-site equipment.

It is an object of the system of the present invention that a cable technician/client may accomplish on-line order processing and transaction completion tasks while in a client's or customer's home or at his or her place of business. It is a feature of this system that it may combine data supplied from the client or customer site with data drawn from distributed data bases in order to efficiently process orders or complete requests, or both. It is an advantage of this system that order processing and transaction completion is fast and efficient and the cable technician/client or customer receives immediate feedback concerning the order or transaction.

Other objects, features, and advantages of the present invention will be apparent to persons of ordinary skill in the relevant art.

BRIEF DESCRIPTION OF THE DRAWINGS

For a more complete understanding of the present invention and the advantages thereof, reference is now made to the following description taken in conjunction with the drawings, wherein like reference numerals represent like parts.

FIG. 5($b$) is a context diagram indicating the general dataflow of a client or customer-site order processing system of the present invention.

FIG. 6 is a diagram providing an example of records stored within the system of the present invention.

DETAILED DESCRIPTION OF PREFERRED EMBODIMENTS

Figure 1:
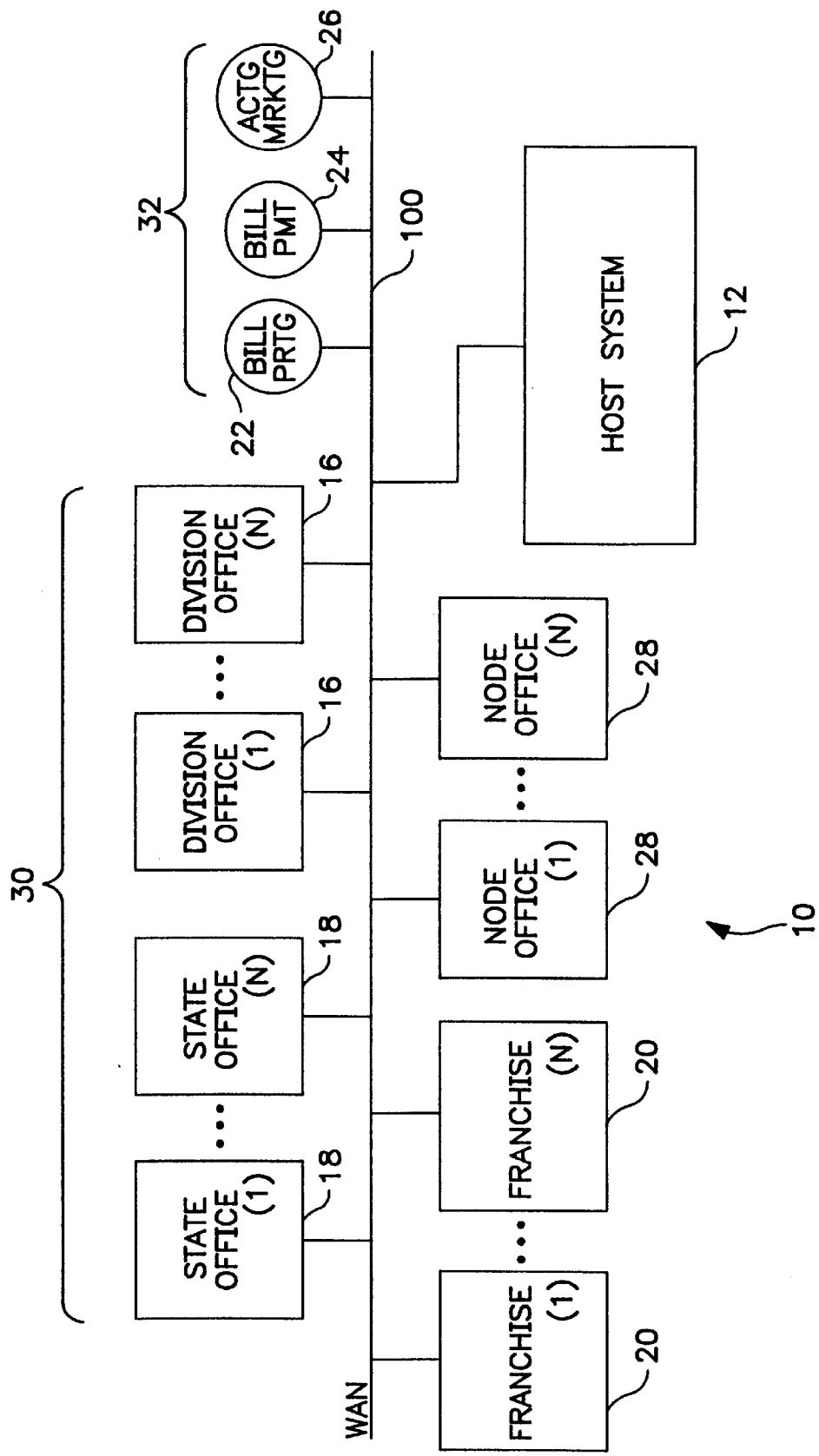
FIG. 1 is a block diagram depicting an embodiment of an overall system architecture.

An overall system architecture suitable for use with various embodiments of the present invention is depicted in FIG. 1. System 10 in FIG. 1 comprises a host system 12, hierarchical systems 30, and supporting systems 32. Hierarchical systems 30 may comprise a plurality of regional office systems 14, a plurality of divisional office systems 16, a plurality of state office systems 18, and a plurality of franchise systems 20 distributed over a wide area network (WAN) 100. Each franchise system 20 may control the operations of a single cable television provider or a plurality of cable television providers. If a plurality of cable television providers are controlled, then each cable television provider in this preferred embodiment has a node system 28 associated with the cable television provider. Support systems 32 may comprise a bill printing system 22, a bill payment system 24, and an accounting system 26 distributed on WAN 100.

System 10 depicts an architecture in which at least six hierarchical levels exist. For example, the hierarchical order may be host system 12, regional office systems 14 (see FIG. 2), divisional office systems 16, state offices 18, franchise systems 20, and nodes 28. System 10 may also comprise additional systems distributed on WAN 100. Moreover, systems with additional or fewer hierarchical levels also are possible.

Host system 12 may have hierarchical control over each subsystem of hierarchical system 30, each subsystem of support system 32, and any other system distributed on WAN 100. As such, centralized control of every system on the network may be achieved. Within hierarchical control system 30, control may be exercised according to a hierarchy. For example, each regional office system 14 may control certain operations of the divisional office systems 16, which have been assigned to it. Similarly, each divisional office system 16 may control certain operations of each of the state office systems 18, which have been assigned to it. Further, each state office system 18 may control certain operations of each franchise system 20, which it has been assigned. Further, if franchise system 20 has more than one associated cable television provider, franchise system 20 may control certain operations of each node system 28 assigned to each of those cable television providers. For example, each node system 28 may be assigned to one and only one franchise system 20, each franchise system 20 may be assigned to one and only one state office system 18, each state office system 18 may be assigned to one and only one divisional office system 16, each divisional office system 16 may be assigned to one and only one regional office system 14, and each regional office system 14 may be under the direct control of host system 12.

Figure 2:
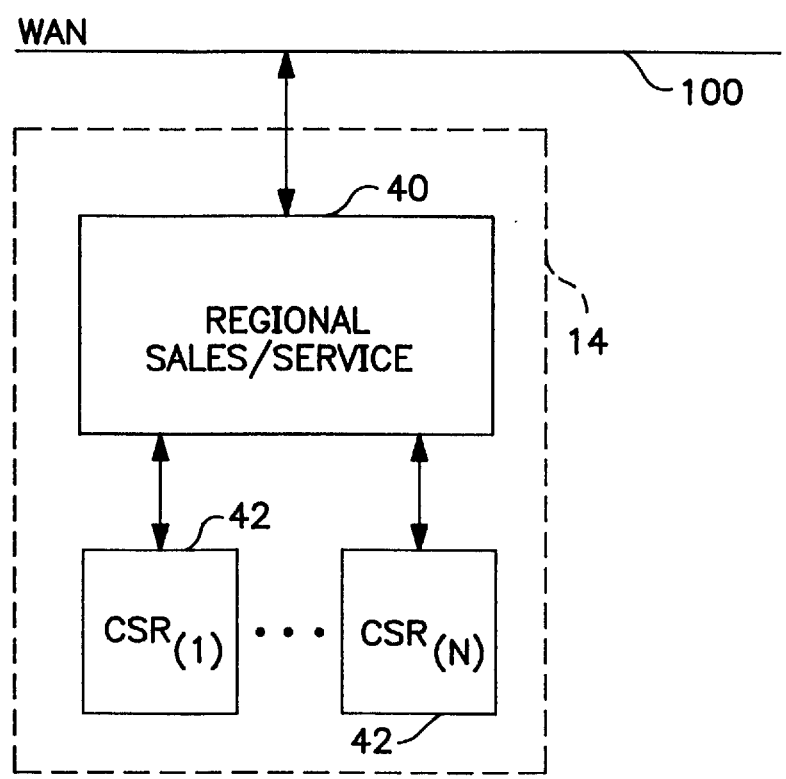
FIG. 2 is a block diagram depicting an embodiment of a regional office system.

Although regional office systems 14, divisional office systems 16, and state office systems 18 may have different functions as described below, their system architecture may be essentially similar. FIG. 2 depicts a system architecture for a regional office system 14 in greater detail. Regional office system 14 comprises a main regional processor 40 connected to WAN 100 and a plurality of customer service processors 42 in communication with regional processor 40. Thus, the architecture for divisional office system 16 and state office system 18 may be similar, each having a main processor connected to WAN 100 and a plurality of customer service processors in communication therewith.

Figure 3:
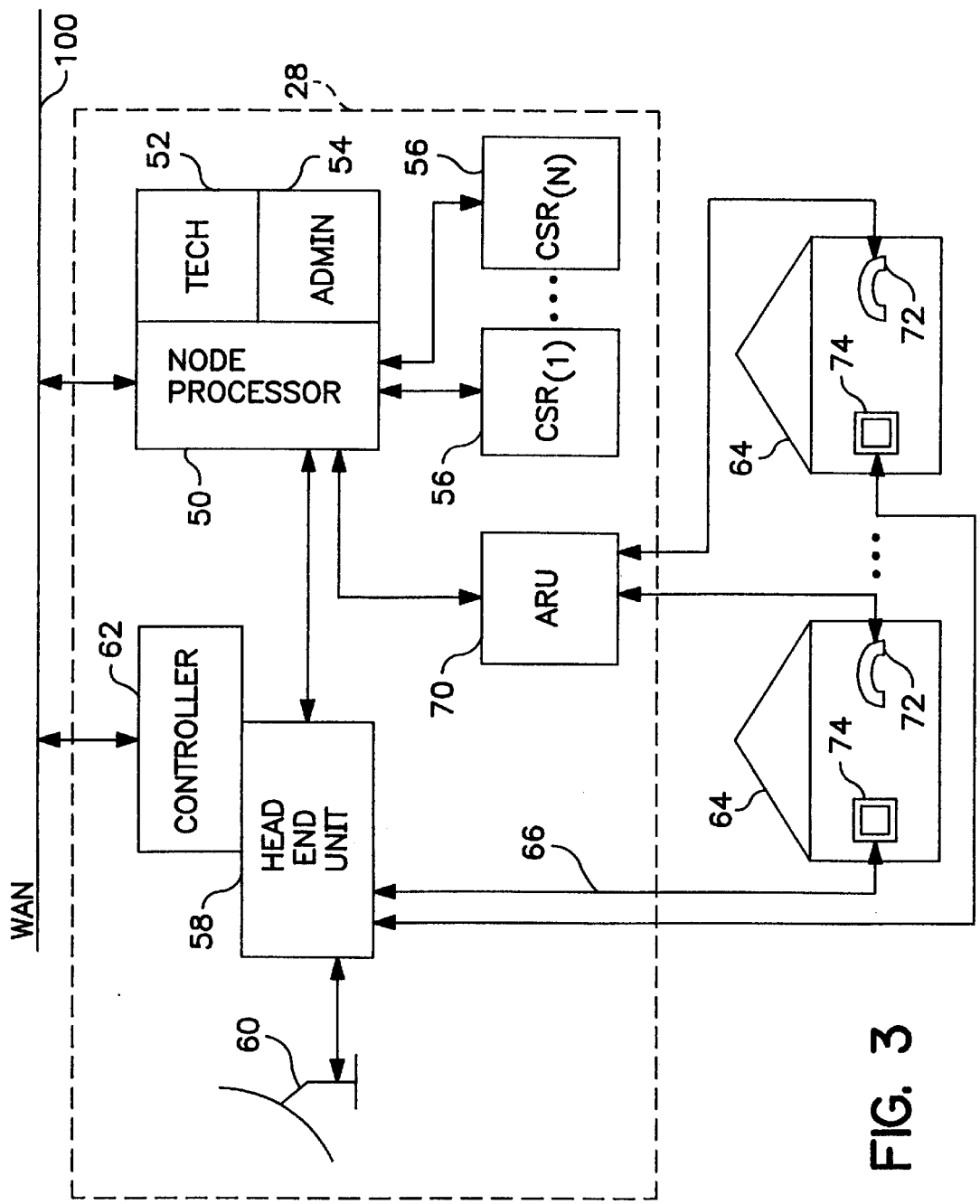
FIG. 3 is a block diagram depicting an embodiment of a node processor connected to the wide area network of FIG. 1.

FIG. 3 depicts the system architecture of a node system 28. Node system 28 comprises a node processor 50 connected to WAN 100. Further, node processor 50 may comprise one or more sub-processors. For example, node processor 50 may comprise a technician control sub-processor 52 and an administration sub-processor 54. Technician control sub-processor 52 may be in communication with one or more technicians, who may be called upon to respond to transactions (e.g., service requests) at one of a plurality service locations assigned to node processor 50. Administration sub-processor 54 may control internal operations of node 28, for example. Node processor 50 may also be in communication with a plurality of customer service processors 56.

In addition, node processor 50 may be connected to a head end unit 58 and its associated head end controller 62. Head end controller 62 may also be connected directly to WAN 100. Head end 58 may also be connected to one or more satellite receivers 60 according to known techniques in the art. Head end 58 may further be connected to at least one television 74 at least one service location 64. The connection between head end 58 may be by coaxial cable, fiber optic cable, telephone lines, and the like.

Node processor 50 may also be connected to an automatic response unit (ARU) 70. ARU 70 is connected to incoming telephone lines 68 and operates to identify incoming callers to more quickly direct their calls. Telephones 72 at service locations 64 may be connected to telephone lines 68 and, thus, to ARU 70. Details of ARU operations are provided below.

Franchise system 20 may either resemble regional office system 14 or node system 28. Moreover, franchise systems 20 may be associated with one or many node systems 28. If only one node is present, franchise system 20 is a node system and, thus, may be similar to node system 28 as depicted in FIG. 3. If more than one node system 28 is associated with a particular franchise system 20, franchise system 2C, may resemble regional system 14.

Figure 4:
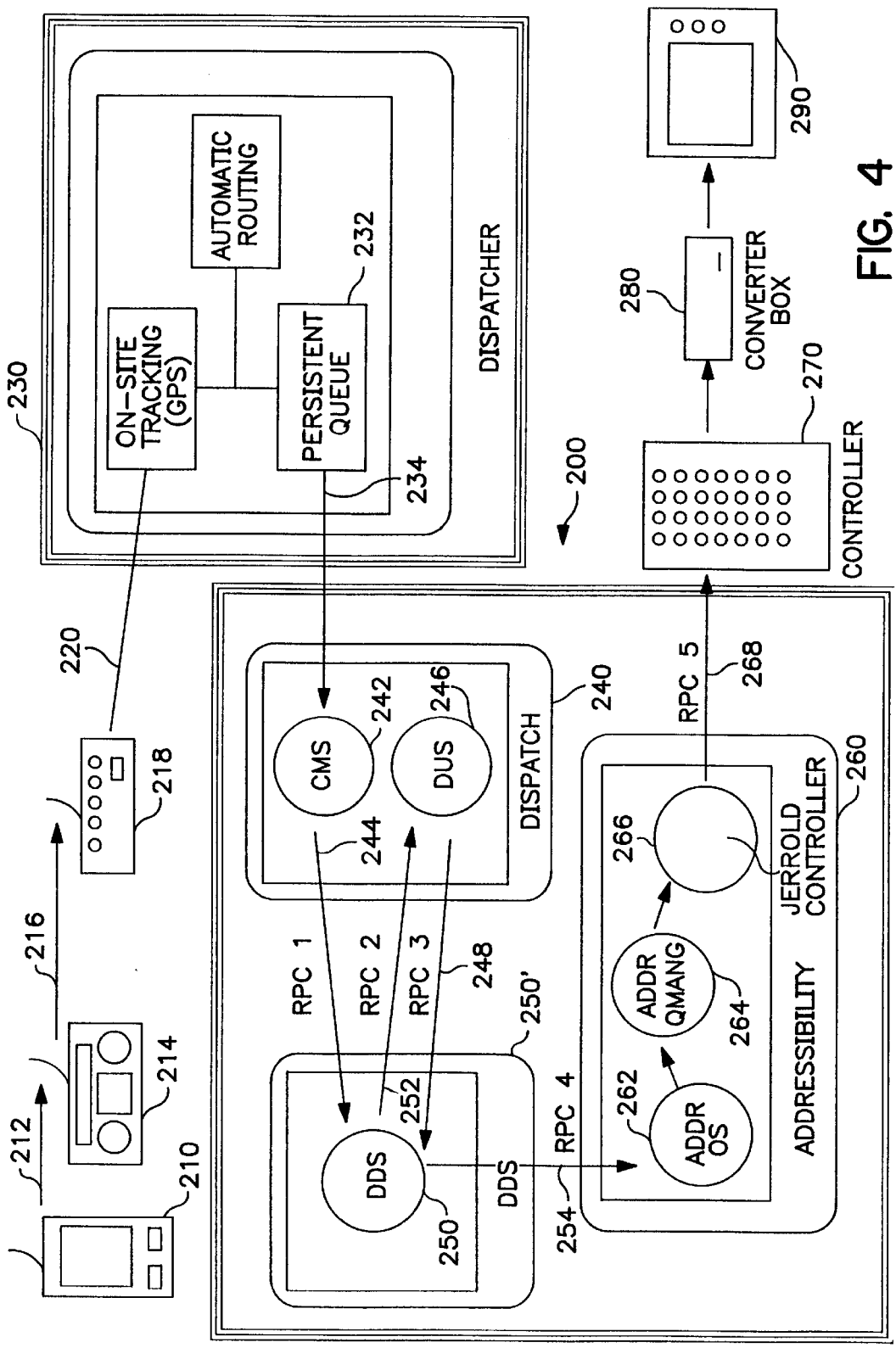
FIG. 4 is a block diagram of an overview of a client or customer-site order processing system of the present invention.

Referring to FIG. 4, an overview of an "In-Home" Order Processing System (IHOPS) 200 of the present invention is depicted. Operation of the system may be initiated by a CSR visiting the home or business of a present or potential cable subscriber (e.g., the client). The visit may be prompted, for example, by the initial installation of cable service, the correction of a service problem, or a service or equipment upgrade. The customer may request a particular product or package of products, or the CSR may offer the customer a short time or one-program promotion to sample a particular product or package of products.

In explaining the present invention and its objects and advantages, a general understanding of terminology is provided below.

A cable television provider is generally any entity which has a franchise to provide cable television programming.

A client is generally the person or legal entity (an individual or a company) that is financially responsible for programming and other services purchased from a cable television provider. For example, the client may be Joe Smith or ABC, Inc.

A service location (or client or customer-site) is generally the physical site (a house, apartment, or business office, and the like) at which a cable television provider provides, or may provide, programming and other services. For example, the service location may be 123 Main Street, Hometown, N.Y.

A product is generally a good or service provided by the cable television provider to the client. For example, the product may be Home Box Office® or installation.

A product parameter is generally any parameter which defines the product. Product parameters may include product name, product availability, product pricing, product start and stop time/date, and the like.

The individual products described above may be grouped based on the type of service and the way in which each is marketed to the subscriber. The following groupings are terms used by cable television system personnel in the definition of products.

Standalone Products—Standalone products represent a low level of product definition and include non-package one-time and recurring charge products. Standalone products are sold to subscribers separately, but may be bundled with other standalone products to create a package or promotion. Examples of standalone products may include: equipment rental, installation, and basic cable packages.

Premium Products—Premium products are optional entertainment services that are offered as a standalone product or in a product package or promotion. Examples of premium products may include HBO®, Cinemax®, Showtime®, TMC®, the Disney Channel®, Starz®, and Encore®.

Ala-Carte Products—Ala-Carte products are a network service that may be included in a basic or expanded basic product, but which has been removed and is sold separately due to contractual restrictions. Ala-Carte products may be bundled with other Ala-Carte products and standalone products to create a package. Examples of Ala-Carte products include: BET®, TNT®, ESPN®, TBS®, and AMC®.

As noted above, these products may be sub-grouped into packages. This narrows the definition of the product based on the selected package which are then presented to the client. For example, a list of such packages may include: premium, basic, expanded basic, and pay-per-view (PPV) movies and sporting events. Premium products have generally been described above. A Basic product may include local off-air programming, such as local VHF and UHF channels that are offered in the subscriber's area; Local Access programming, such as channel slots that are provided for local government and local programming; and Congressional access programming, such as C-SPAN 1 & 2®. Often, cable television providers are required to carry local and Congressional access channels as a matter of law. An expanded basic package is essentially a Basic package which has to be tailored to meet particular customer desires by the addition of selected ala-carte products.

A product transaction, such as a package order, may be initiated by a cable technician entering data describing the customer, the product/package, its start and stop times, and the type of equipment at the customer's site on a portable transmitter or transceiver 210, e.g., a Telxon® transmitter. All of the necessary information to initiate the product package service may be entered by the cable technician. This information may be input alpha-numerically using a keyboard, by activating sites on a screen display with a light-pen, or by selecting icons with a mouse, or by similar means. For example, the transmitter/transceiver 210 may utilize a menu screen or display identifying various categories and employing pull-down bars to enter information. In any event, the method of and means for inputting data may vary with the structure of transmitter or transceiver 210. Alternatively, some or most of the necessary data to initiate service may be stored in and retrieved from databases accessible through the system.

Referring again to FIG. 4, an "In-Home" Processing System (IHOPS) 200 may include four basic elements. First, a combination of apparatus, such as transmitters, receivers, and modems, and means of data transmission, such as coaxial cable and telephone lines, which receive the transaction in the customer's home or at his or her place of business and relay it to the second basic element, the dispatcher. The dispatcher may comprise various components to process the transaction and convert it into a message form at readable by the other basic elements of the IHOPS. In a particular embodiment, the dispatcher may comprise a queue, such as a persistent queue, in order to store the transactions as they are received by the dispatcher. The third basic element of the IHOPS may include three modules: the dispatch module, the data delivery server module, and the addressability module, for processing transactions relayed by the dispatcher. The dispatch module receives the transaction message from the dispatcher and passes it to the data delivery server module. From the data delivery server module, the transaction is returned to the data utility server portion of the dispatch module, so that data needed to complete the implementation of the transaction may be extracted, and the transaction message, enhanced with the extracted data, then is returned to the data delivery server. The data delivery server then transmits the enhanced transaction message to the addressibility module. The addressibility module determines the appropriate controller for accomplishing the transaction, and formulates a transaction message for transmission to the fourth basic element of the IHOPS. This fourth element may include the controller identified by the addressibility module; a converter box, if appropriate; and a television or television monitor.

Portable transmitter or transceiver 210 may send the initiating data via RF signal 212 to a relay transmitter or transceiver 214. Transmitter or transceiver 214 may be located in the cable technician's vehicle or it may be more permanently positioned at a location within range of a group of cable technicians serving all of the cable television subscribers within a geographic area. RF relay signal 216 is sent by relay transmitter/transceiver 214 to a modem 218, which converts relay signal 216 to a machine readable form compatible with the other elements of the IHOPS 200, and transmits the initiating data via standard computer cable 220, such as RS-232, to dispatcher 230. Moreover, the various components and connections between transmitter or transceiver 210 and dispatcher 230 may be replaced with a pager.

Dispatcher 230 processes the initiating data, identifies its source, and formats it for further processing within the IHOPS 200. Dispatcher 230 is a means for (1) tracking the location, e.g., by use of a Global Positioning System (GPS), of the technician; (2) automatic routing of orders generated by the technician to the appropriate node, franchise, or the like, for example, based on algorithmic parameters; and (3) maintaining at least one queue. Thus, dispatcher 230 places the initiating data message in a queue, for example, in a persistent queue 232, to allow system 200 to process the data inr the order in which it is received and to allow the message to be retrieved from the queue at anytime by the IHOPS. Further, persistent queue 232 allows information to be recovered from the queue despite interruptions in system continuity, for example, due to power losses. In an embodiment, the functions of dispatcher 230 may be performed by FLEETCON™ dispatch system software, which is made available commercially by Anfowsmith Technologies, Inc. of Austin, Tex.

A message 234 is retrieved from persistent queue 232 to a Client Message Server (CMS) 242. CMS 242 is located within a dispatch module 240 and transmits the information of message 234 to a Data Directory Server (DDS) 250 in a DDS module 250'. Message 234 is relayed from dispatcher 230 to CMS 242 in dispatch module 240 by means of a socket-to-socket connection; for example, by a Transmit Control Protocol/Internet Protocol (TCP/IP).

However, in the embodiment of FIG. 4, there is no SYBASE® interaction between dispatcher 230 and dispatch module 240. The information sent from CMS 242 is contained in a message 244 which may be a Remote Procedure Call (RPC). DDS 250 manages the routing of all incoming CMS messages to an available Dispatch Utility Server (DUS) 246. DUS 246 is located within dispatch module 240, and available DUS 246 is identified by DDS 250 according to a set of preconfigured rules.

DUS 246 accepts a message 252 from DDS 250 and extracts additional equipment and product/package information from associated databases (not shown), which is necessary to perform the addressability transaction and complete the transaction processing. Once the additional information has been extracted, DUS 246 transmits a message to an Addressability module 260 via DDS 250. For example, DUS 246 may transmit a message 248, e.g., an Addressability Change Services RPC, to be relayed as a message 254 via DDS 250.

An Addressability Open Server 262 accepts message 254, e.g., the Addressability Change Services RPC, sent via DDS 250 and extracts the pertinent controller information from the message in an Addressability Manager Server 264. Once the controller has been identified, e.g., TAC, Jerrold, SA, Tocom, or Zenith, an appropriate message 268 is formulated in the portion of Addressability module 260 associated with the identified controller, such as controller server 266. Message 268 is sent to a Controller 270 from which it is relayed to a television or television monitor 290 located in the subscriber's home or business via an installed cable convertor or separate convertor box 280.

Figure 5A:
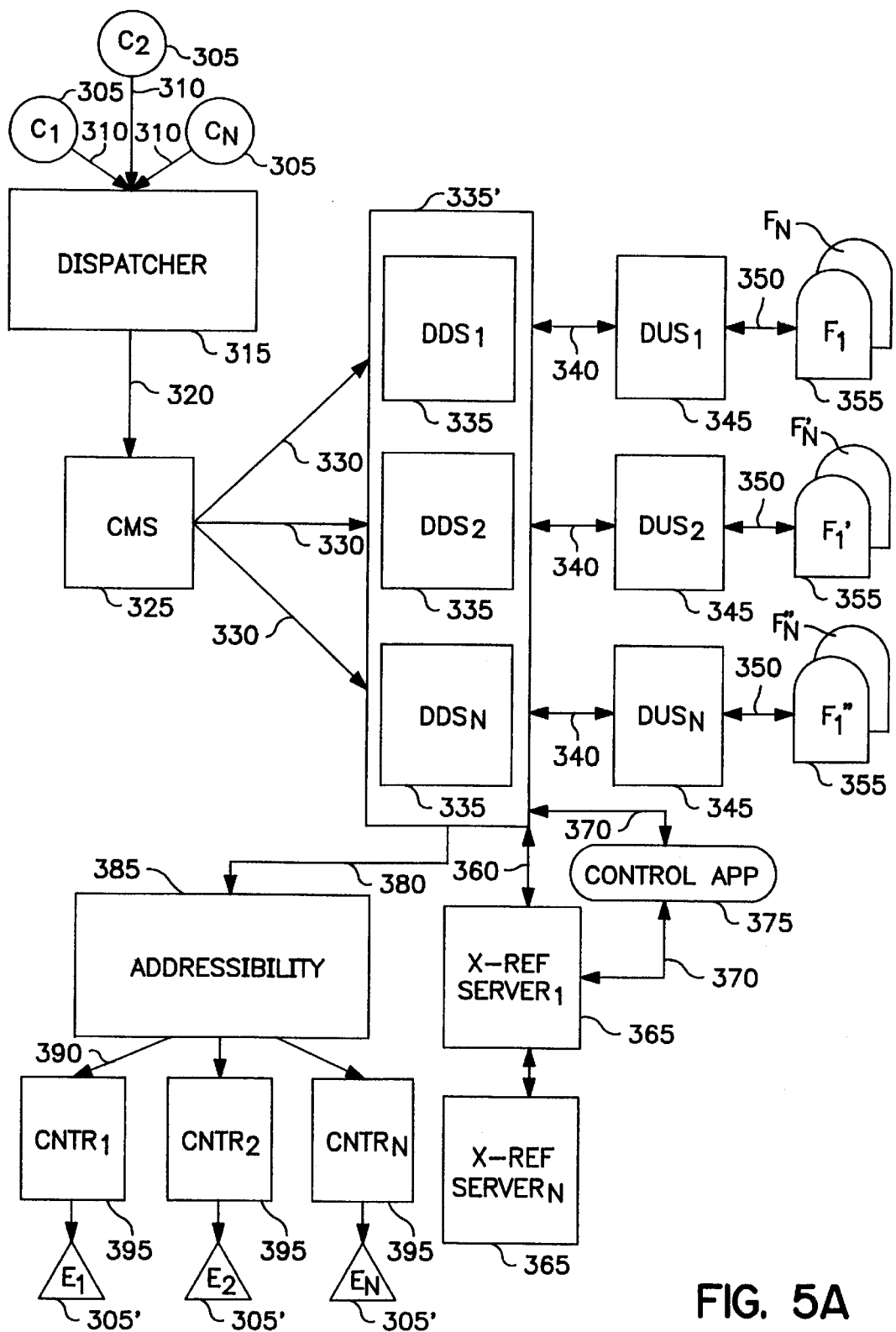
FIG. 5($a$) is a block diagram depicting of the interfaces of the present invention.

FIG. 5a further illustrates the system and architecture of one embodiment of the present invention. The invention is described in connection with an "In-Home" Order Processing System (IHOPS) 300 having a distributed database. Such system is useful for, among other things, for rapid enabling or disabling of cable television products/packages. However, the invention is not limited to this use. Examples of other uses include telephone equipment and computer on-line services authorization, alarm system monitoring services, and the like. As shown in FIG. 5a, the IHOPS 300 may comprise a plurality of transaction generators 305, A, customer representatives labeled C, through CN, where N equals an integer. Each transaction generator 305 is connected via a remote communication link 310 with a dispatcher 315. Dispatcher 315 stores database transactions transmitted over link 310 in a persistent queue before further transmitting them to a Client Message Server (CMS) 320. The database transaction transmitted over link 310 may take the form of a Box Hit Request RPC and the actual message may comprise the following:

Box Hit Request
    Fulfillment Center ID
    Work Order Number
    Converter Serial Number
    Converter Type
    Message Type.

Because this database transaction is placed in a persistent queue, the message may be retrieved at anytime. Nevertheless, an embodiment may allow the message to be read immediately as supplied.

The database transaction may then be transmitted from CMS 325 via data links 330 to one (or more) data directory servers (DDS) 335. The present invention may include one or more DDSs 335. Each DDS 335 in turn is connected via a two-way communication link 340 to multiple dispatch utility servers ($DUS_{1 \ldots N}$, where N equals an integer) 345.

As noted above, CMS 325 accepts the Box Hint Request RPC from dispatcher 315. CMS 325 then transmits a new message, which also may be in the form of a RPC, e.g., an rp-AddrMessage, to DDS 335 for further transmission to DUS 345. The message may comprise the following:

rp-AddrMessage
    Fulfillment Center ID
    Work Order Number
    Converter Serial Number
    Converter Type
    Message Type.

Each DUS 345 is in turn connected to one or more databases 355 either as components of a single subsystem (processor and database) or through a two-way communication link 350. Additionally, each DDS 335 is connected via a two-way communication link 360 to one or more cross reference servers ($XREF_{1 \ldots N}$, where N equals an integer) 365.

FIG. 5a indicates a DDS module 335' comprising $DDS_1 \ldots N$ 325, where N equals an integer, representing DDS functionality within IHOPS 300. It is to be understood that, although not shown in FIG. 5a, connections between transaction generators 305 and DDSs 335 as well as those between data servers 345 and DDSs 335 are preferably individual connections rather than to a grouping of DDSs such as DDS module 335'. For example, transaction generator $C_1$ may be separately connected to each of the DDSs. Alternatively, however, DDS functionality may be grouped with common connections to transaction generators 305 and/or DUSs 345, as indicated in FIG. 5a, so long as control between DDSs 335 is maintained.

Additionally, IHOPS 300 includes at least one control application 375 for communication between the DDS(s) 335 and a human operator and/or another IHOPS process. As will be discussed in more detail below, the control application 375 provides, among other functionality, a means for updating the internal rules used by the DDSs 335 to identify the available DUS 345. As described in more detail below, when a transaction is generated by a transaction generator 305 and sent to a data directory server 335, the data directory server 335 determines the appropriate DUS 345 for execution of the transaction. Preferably, this is accomplished by the DDS 335 consulting the internal rules and identifying the arguments associated with the transaction, as detailed below.

IHOPS 300 of the present invention is designed to manage a very large number of transactions occurring within the system. IHOPS 300 of the present invention provides the ability to query across the entire database from any subscriber in the system. Similarly, each of the users may update data located anywhere within IHOPS 300.

Client—Transaction Generator

The transaction generators 305 in the system of the present invention may be any devices capable of receiving input from a user and transmitting that input to DDSs 335. This type of device is often referred to as a "Client" and these terms are used interchangeably herein. These devices may be dumb terminals (i.e., incapable of performing local processing) or they may have various processing capabilities of their own. Examples of transaction generators include, without limitation, Telxon transmitters; Personal Computers, such as laptops; and the like. In typical applications, there will be a plurality of transaction generators 305, such as one for each cable television technician or CSR. Thus, IHOPS 300 is designed as an open platform environment which is hardware independent. The transaction generators 305 may be homogeneous in teirms of interface and operation or they may be heterogeneous. In other words, all transaction generators 305 may be of one type or there may be a variety of devices interacting with the DDSs 335. It is also possible to permit Client interaction with IHOPS 300 through an ARU/ANI (Automated Interactive Voice Response Unit/Automatic Number Indicator) (not shown). In this case, much of the processing may be driven by the telephone number retrieved by the ANI when the subscriber calls into the system.

Data Delivery Server

The DDSs 335 of the present invention function as the middle tier of a three tier system architecture. As illustrated in FIG. 5a, more than one DDS 335 may exist within IHOPS 300. In such case, each of the DDSs 335 has communication access to all of the other DDSs 335 as well as to each of DUS 345. DDSs 335 serve three primary functions. After receiving a transaction, the selected DDS 335 first locates the appropriate/available DUS 345 for the further processing of the transaction, it then submits the transaction to the DDS 335 which forwards it to the Addressability module 260.

Transaction generators 305 requesting information from the IHOPS databases must connect to a DDS 335 prior to accessing data. Through the use of internal rules, the DDSs 335 determine how a remote procedure should run in order to complete processing of a transaction. For example, these internal rules may be provided directly from a control application 375 via connections 370 or indirectly via X-Ref Servers 365. These operations are discussed in greater detail below. Access to the DDSs 335 may be efficiently implemented through the use of remote procedure calls (RPCs) which are identified in tables internal to the DDS 335. Any of a plurality of standards for such RPCs may be used with the current invention.

The DDS(s) 335 are preferably open server applications that provide a mechanism to direct any data request associated with a generated transaction to DUS 345 available to service the transaction generator's requests. Specifically, DDSs 335 may be open servers comprising the same or similar hardware as DUS 345 of the present invention. Alternatively, DDSs 335 may be configured differently from DUS 345. DDSs 335 function to analyze the client's transaction and, based upon the transaction type and on an internal set of rules, direct the transaction to the appropriate DUS 345. The types of transactions which are received at DDSs 335 are based upon a set of stored procedures recognizable to DDSs 335 and available to the transaction generators 305.

Prior to discussing the specifics of database transactions according to the methods and systems of this invention, it is necessary to understand that DDSs 335 preferably operate according to a limited number of event handlers responsible for processing the transactions generated by the transaction generators 305, as well as internal requests generated as a result of DDS processing itself. For example, the event handlers may include, but are not limited to, the following:

1. Start Handler—The start handler provides a convenient and central location for installing any other event handler routines, building any tables necessary for processing Client requests and for installing any other services that the DDS requires for its functionality.
2. Stop Handler—The stop handler is executed when a request to shut down the system has been received through a particular request or as a result of certain system conditions.
3. Connect Handler—The connect handler is executed whenever a Client connects to the DDS.
4. Disconnect Handler—The disconnect handler is executed whenever a Client terminates an active connection to the DDS.
5. Language Handler—The language handler is executed whenever a Client application issues a language statement to the DDS. The language handler in the DDS does nothing because all Client requests are required to be either registered procedure calls or remote procedure calls.
6. RPC Handler—The Remote Procedure Call handler carries the bulk of the load borne by the DDS and is the most important handler for purposes of this discussion. Any Client transaction which is not registered in the DDS registered procedure table will generate an RPC handler event where the request is analyzed by the RPC event handler and acted upon accordingly.
7. Error Handlers—Several error handlers are installed in the DDS application to provide information on any failure from the Client or the components of the DDS. All error messages are logged in the DDS.
8. Attention Handlers—An attention handler is installed to handle disconnects from a Client. The DDS has been set up to cause all Client disconnects to generate an attention event in order to determine if the Client has interrupted its connection to the DDS.

The functionality comprising the operation of the DDS may be categorized into three separate classes—the main function, the local DDS registered procedures and the utility functions. The main function provides the entry point for all executable C programs. Although the preferred embodiment is formulated using the C and C++ languages, the invention described herein is by no means limited to such a design. The error handlers and the start handler are installed in the main function body. These include a set of routines which serve to parse input parameters and configuration file attributes in order to set up any DDS properties. The network listening function is spawned in the main function body and sleeps until the DDS application is terminated either normally or abnormally.

The DDS application is dependent on several global data tables. These global tables are used to control the navigational decisions that the RPC Handler needs to direct the Client's transactions to the appropriate data server in order to complete the data request. A more detailed discussion of the global tables, including construction, maintenance, and use, follows below.

The Open Server Install Registered Procedures, os—install—reg—procs ( ), function provides a central installation point for all registered procedures on the DDS and is grouped in the start handler classification. Service requests originating at the Client that are not identified as a registered procedure, are treated as remote procedure calls and are handled by the RPC Handler. All of the event handlers and supporting system functions provide a trace log of activities in a locally maintained log file. This file is preferably truncated every time the DDS application is started.

Dispatch Utility Servers

The DUSs 345 maintain customer data and are accessible by each of the transaction generators 305 through a DDS 335. In a typical implementation, the dispatch utility servers are SQL devices which are capable of executing the RPCs transmitted by a DDS 335. Databases 355 ($F_{1...N}, F'_{1...N}, F''_{1...N}, ...$, where N equals an integer), which support DUS 345, may be either homogenous or heterogeneous.

The customer records in FIG. 6 contain various information about the customer and his, her, or its account. In a typical implementation, there would be much more data. In the example, the first item listed is a customer number. In the preferred embodiment, each customer record corresponds to a unique customer number. Next, the customer name is listed followed by the customer's birth date. Also included is the customer's telephone number, the services subscribed to, and any recent pay-per-view activity as well as the associated cost. Finally, a code for the cable operator location for the subscriber is included.

In a homogeneous environment, particular protocols for accessing each of the databases are consistent throughout the hierarchy. Conversely, in a heterogeneous environment, the particulars of database access may vary within the server. In a heterogeneous environment, it is often desirable, however, to render any differences in requirements within the enterprise transparent to a cable technician or CSR at the client site. Thus, a cable technician or CSR ideally is not aware of any database heterogeneity, and a transaction preferably is processed in a standard manner across all resources. Databases 355, which are accessed in a distributed system, may all be located together or they may be physically apart. They may be at the client location or they may be at an alternate site. Databases 355 may be relational databases, such as SYBASE® databases (a trademarked product of Sybase, Inc.), or they may be as simple as a series of flat files. DUS 345 accepting the rp—AddMessage RPC from DDS 335 extracts additional equipment and product information from databases 355, which is needed to perform the Addressability portion of the transaction.

Control Application

Returning to FIG. 5a, it can be seen that the DDSs 335 may interface with a control application 375. The control application 375 functions to allow a system operator to store, update, and modify stored procedures available to all transaction generators 305. This is typically accomplished by downloading the update to the X-Ref Server 365 which loads a rules database into DDSs 335 at DDS startup.

X-Ref Servers

An IHOP System also may include one or mere X-Ref Servers 365 which function as a resource available to DDSs 335 for determining where specific data resides in the system and for storing a rules database to be loaded into DDSs 335 at DDS start-up. Further, the X-Ref Servers 365 may contain a variety of global tables which are continually updated as data is added, updated, and deleted within the system.

Addressability Module

Finally, FIG. 5a depicts an Addressability module 385. As noted above, after DUS 345 extracts the additional equipment and product information from databases 355, it formulates an Addressability Change Services RPC. This RPC is transmitted to Addressability module 385 via two-way communication link 340, DDS 335, and communication link 380. The RPC may comprise the following format:
Change Services
    Converter Equipment ID
    HUB ID
    Hotel Indicator
    Add Service Code
    Delete Service Code
Addressability module 385 accepts this Change Services RPC and extracts the pertinent controller information from the message. Addressability module 385 then identifies the appropriate controller ($CNTR_{1 \ldots N}$, where N is an Integer) 395, calls Controller 395 via communication link 390, and instructs it to enable or disable service at equipment site 405. For example, although the RPC will differ for each controller, the RPC for a TAC controller may comprise the following:
    Hit Equip Parameter
        Equipment Serial Number
        Equipment Type
        Parameter
        Value
Turning now to FIG. 5b, a context diagram and flow chart, respectively for the IHOPS 300 as controlled and regulated by DDS 335 are provided. In a preferred embodiment, the DDSs 335 access the XRef Server(s) 365 at startup to access database information employed for the operation of DDSs 335. After the start-up tasks are complete, client transactions may be processed by DDSs 335. Alternatively, the DDSs 335 may access the XRef Server(s) 365 (or any other system component containing the desired data, es, DUSs 345) as transactions are received by DDSs 335.

For example, Client product orders are initiated at the transaction generators 305 and transmitted to a DDS 335 via Dispatcher 315 and CMS 325. Once it has received the data request, the DDS application consults the DDS Server Table (a global table) which identifies all of the available and accessible data servers, including DUSs 345. There is also provided an XRef Server Table (global) which identifies all known and accessible XRef Servers 365. An additional global table is the Error Message Handler Table which maintains all error handler messages. All of the global tables defined in DDS 335 provide feature functionality to support the access related to these tables.

Figure 5B:
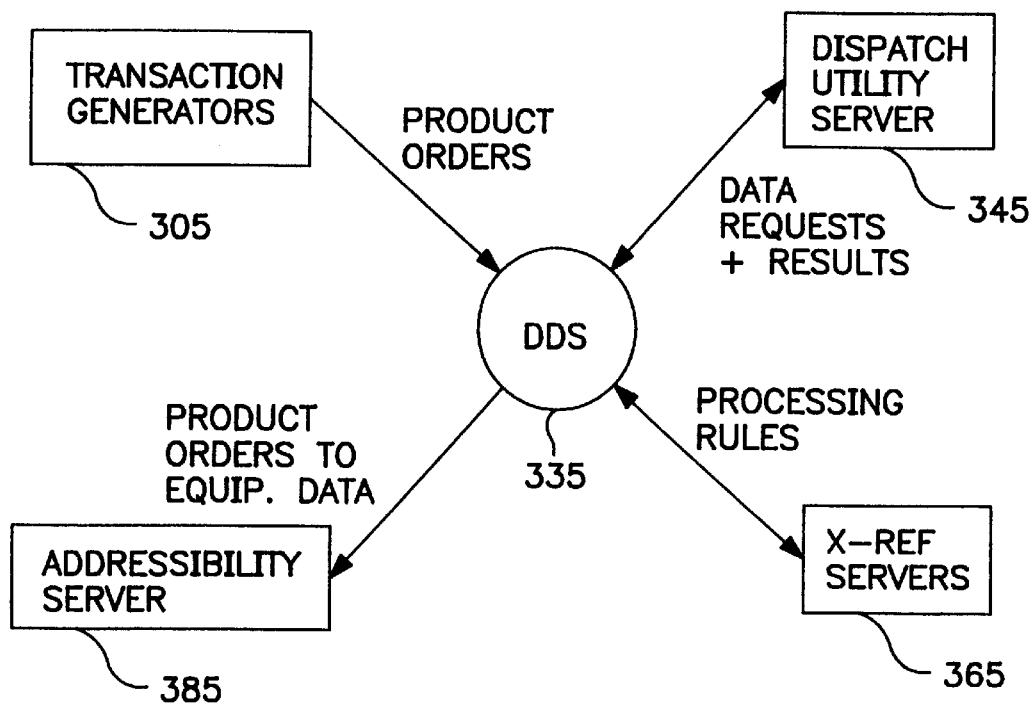

FIG. 5b depicts a context diagram of the system and also shows the various transaction generators 305 connected to DDS 335. Transaction generators 305 make requests for product/package enablement and disablement through DDS 335. As discussed above, once such a request is received, DDS 335 may determine the set of available DUSs 345 which may execute the request and selects one or more servers from that set for servicing. The subset of servers which are available to process the request may be determined in the manner discussed above. In a first embodiment, global tables are loaded from the XRef Server 365 into an internal DDS memory at DDS startup. In a second embodiment, no such loading occurs at startup - rather, upon receiving a product order, DDS 335 submits a request to the DUSs 345 in order to retrieve the necessary data. In either embodiment, DDS 335 has available to it the rules database and other data which is required to determine the type of transaction (including the data required and the locations of that data) and to select an available DUS 345 for processing the transaction. After processing the request, DUSs 345 return a message containing the processing results to the DDS 335 which then transmits the order to the addressability server 385. Confirmation of the order processing then may be sent back to transaction generator 305.

After a product order has been processed and confirmation returned to the transaction generator 305, DDS 335 may receive another transaction and process it in accordance with the above procedure. In such an embodiment, DDS 335 does not begin processing a new order until it has completed processing of the prior order. In another and a preferred embodiment, a single DDS 335 processes multiple product orders concurrently exploiting the availability of numerous DUSs 345 and Addressability servers 385 for processing a plurality of transactions simultaneously.

As mentioned above, the DDS 335 maintains several global tables which are constructed and supported by classes. These tables inform the system of where data resides and where it is to be routed, as well as methods for locating and routing such data. The first class to be discussed is the Server Table Class. The Server Table Class is a global class. This class references all available servers in the IHOPS 300. The Server Table class supports two tables that are constructed from DDS data files. The first table, the DDS Server Table, identifies all available data servers, including DUSs 345, that are accessible by DDS 335. The second table supported by the Server Table Class is the XRef Server Table, which refers to all available XRef Servers. Both of the Server Tables provide server names, logins, and password information to DDS 335, so that it may access any DUS 345 within IHOPS 300.

The Server Table class employs information structure pointers to support the list of available servers specified by the class instantiation. The class provides methods to randomly retrieve the next available server in the table or to select a specific server in the table. In addition, it is possible to retrieve the user ID and password associated with a server as well as the number of servers available.

The XRef Server Table is built on the instantiation of the Server Table Object through the applicable DDS data file. The Server Tables are built based on the server names, and in a preferred embodiment, the initial ordering may be alphabetical by server name. The DDS Server Table is a global table which is also constructed from the DDS data file. The Server Table Class definition of a preferred embodiment is given below:

```
class ServerTbl
{
private:
        SrvInfo         *_server;        //server information structure
        CS_INT          _next;           //next server name
        CS_INT          _serverCnt;      //server count
protected:
                        ServerTbl();
public:
                        ServerTbl(CS_CHAR*,constCS_CHAR*);
                        ~ServerTbl();
        CS_CHAR         *GetNext();
        CS_CHAR         *GetUID();                      //inline
        CS_CHAR         *GetPswd();                     //inline
        CS_INT          GetCnt();                       //inline
        CS_CHAR         *GetSpecific(CS_INT I);         //inline
        CS_VOID         UpdateTbl(CS_CHAR*,const CS_CHAR*);
}
```

This definition identifies the server information structure, the next available server, and the number of servers of a specified type. It is to be understood that the class definition illustrated above is given by way of example only and is not the only possible class definition which may be employed in the present invention.

The ServerTbl class definition includes the _server information structure pointer which supports a list of available servers specified by the class instantiation and contains the server name, a user ID, and a password. The user ID and password are available for use with any system administration functionality that supports the DDS server. The _next data member is an integer value that contains the next element of the _server list (the next available server). It is possible to access this information through a calling routine discussed below. Finally, the _serverCnt element is included. This member also is an integer value containing the number of servers available to the calling routine.

The Server Table class definition of the preferred embodiment also contains various member functions. The class constructor ServerTbl(CS_CHAR *, const CS_CHAR *) takes as arguments the type of server (XRef, DUS, or DDS) and the server data table name. When called, this constructor initializes the member data and calls the UpdateTbl function with the same arguments. As a result, the server table may be initialized and built.

The UpdateTbl function performs all of the DDS data file management to obtain the required information concerning a specified server. In addition, this function serves to build the Server Table. The GetNext function returns the next available server in the instantiated table. This function provides a level of randomization to evenly distribute server request loads. The GetUID function returns the current user ID for the specified server. The GetPswd function returns the current user password for the specified server. The GetCnt function returns the current number of servers of the instantiated type. Finally, the GetSpecific function returns a specifically requested server table entry.

The next class to be discussed is the Server Name class. Again, various functions may be associated with this class, for example, to allow the DDS to select a stored procedure. The server name is represented by this class definition which identifies the current server table element and the procedure element requesting the server name. The Server Name class definition of a preferred embodiment is provided below:

```
class SrvName
{
private:
        ProcElem        *_p;
        CS_INT          _argVal;
        CS_INT          _curElem;
public:
                        SrvName(ProcElem*,CS_VOID**);
                        ~SrvName();
        SrvElem         *GetNext(SrvElem*&);
        SrvName&        operator=(const SrvName&);
        CS_INT          GetSrvCnt();
        CS_INT          GetSrvTyp();
};
```

The Server Name class identifies the current server table element that supports the current stored procedure in the procedure list. In addition, this class provides data elements that point to the current stored procedure in the procedure list table. Finally, the class stores parameters associated with the current stored procedure and a current element flag.

The _p data member is a pointer to the procedure list table stored in the DDS. The _argVal data member contains an integer value that identifies the argument position for any rule based stored procedure. The _curElem member is an integer which represents the currently selected procedure from the procedure list.

The GetNext( ) member function applies the rules for retrieving the appropriate server name. As will be discussed below, this is necessary when the DDS must process an "ANY" product order. The GetSrvCnt( ) simple returns the number of servers associated with the current stored procedure. The GetSrvTyp( ) returns the distributed transaction processing (DTP) code back to the requester. As will be discussed below, the DTP code refers to a particular processing paradigms including ANY, ALL, and SPECIFIC.

The class constructor and destructor functions allocate memory and construct the server table and deallocate and release the table respectively. An additional function provides a mechanism to return the name of the next server in the list. The member functions for the Server Name class are illustrated in Table 1.

TABLE 1

SERVER NAME CLASS FUNCTIONS

```
* SrvName :: SrvName(ProcElem *_p, void **argList)
    Assign procedure element _p to SrvName class variable.
    If the argList a is not NULL
        Assign the argument position value to the class variable
    initialize the current element class variable to 1
* SrvName :: GetNext( )
    if (-P->firstSrv) // GROUP
        if((_p->dtpCode == ALL) &&
        (_curElem<=_p>elemCnt))
            curSrv = _p->firstSrv[_curElem - 1]
            ++_curElem
        else if ((_p ->dtpCode == ANY) && (_curElem == 1))
            rNum = _p->firstSrv[GetRandom( )]
            ++_curElem
        else if ((_p ->dtpCode == SPECIFIC) && (_curElem == 1))
            curSrv = _p->firstSrv[_curElem - 1]
            ++_curElem
        else
            retrieval is complet, return a NULL pointer value
            reset _curElem to 1
    else if (_p -> firsRule)
        for I = 0; I < _p->firstCnt; I++
            if _argVal == NULL
                set curSrv to NULL
                the parameter for this stored procedure is missing
```

TABLE 1-continued

SERVER NAME CLASS FUNCTIONS

```
            if _argVal <= _p -> firstRule[i] -> high val &&
                _argVal >= _p -> firstRule[i] -> lowVal &&
                _curElem == 1
                curSrv = _p->firstSrv[i].servers
                curSrv -> dbName = _p->dbName
                increment _curElem
                break out of for loop
            else if _curElem > 1
                set curSrv to NULL
                reset _curElem to 1
                break out of for loop
            else
                continue
        end for loop
    else
        set curSrv to NULL
        there is a problem with the XRef Data Tables
    return curSrv;
* SrvName :: GetSrvCnt( )
return _p->firstCnt
*SrvName :: GetSrvTyp( )
return _p->dtp_code
```

The next group of classes to be discussed relate to the XRef Data tables. The XRef Data tables consist of database information that supports the decision making requirements to access the various data servers supporting the IHOPS application. Four tables located within the XRef Server contain information related to:

- all of the stored procedures available for a client to submit to the DDS;
- all of the data servers accessible by the DDS;
- the various server groups that the data servers fall into; and
- the rule boundary information that binds the rule based stored procedures to the data server(s) that can support the client request.

This information is retrieved from the XRef Server by the DDS application at startup. The data is stored in at least three tables internally within the DDS. For example, the three internal tables may be:

1) Procedure table—which consists of all stored procedures;
2) Server table—which consists of all data server data; and
3) Rule table—which consists of all decision rule data The data structures for these tables are constructed by stored procedures that return results in a format consistent with DDS internal storage format. Each of these tables is supported through the XRef class definition and is given below:

```
{
    char        SrvName[MAXNAME];
    char        warmSrv[MAXNAME];
    char        grpName[MAXNAME];
    int         srvConn;
    int         warmConn;
};
struct RuleElem
{
    char        ruleName[MAXNAME];
    int         lowVal,
    int         highVal,
    char        srvName[MAXNAME],
    SrvElem     *servers
};
struct ProcElem
```

-continued

```
{
    char        procName[MAXNAME];
    char        grpName[MAXNAME];
    char        ruleName[MAXNAME];
    char        srvName[MAXNAME];
    char        dbName[MAXNAME];
    PROC_TYPE   pType;
    DTP_CODE    dtp;
    int         argPos;
    int         firstCnt;
    SrvElem     *firstSrv;
    RuleElem    *firstRule;
};
```

The XRef Data tables are represented by a class that defines data structures for the stored procedure list, the server list and the rules list. A count is also maintained for each of the lists. The XRef Data table class of a preferred embodiment is given next: class XRefDataTbl

```
{
private:
    ProcElem    *_procList;
    SrvElem     *_srvList;
    RuleElem    *_ruleList;
    CS_INT      _procCnt;
    CS_INT      _srvCnt;
    CS_INT      _ruleCnt;
protected:
    XRefDataTbl();
public:
    XRefDataTbl();
    ~XRefDataTbl();
    CS_INT      GetProcCnt();      //inline
    CS_INT      GetSrvCnt();       //inline
    ProcElement *GetProcList();    //inline
    CS_RETCODE  GetServer(CS_CHAR*,CS_VOID**,SrvName*);
    CS_RETCODE  UpdateTbl(CS_CHAR*CS_CHAR*,CS_CHAR*);
    CS_RETCODE  RunRpc(CS_CONNECTION*,CS_CHAR*,
                CS_INT);
    CS_RETCODE  BldList();
};
```

The _procList member data is a pointer to the list of stored procedures stored in the XRef data tables within the DDS. The _srvList member data is a pointer to the list of data servers stored in the XRef data tables within the DDS. The _ruleList member data is a pointer to the list of rules stored in the XRef data tables. The _procCnt member data is an integer value containing the number of stored procedures stored in the procList. The _SrvCnt member data is an integer value containing the number of data servers stored in the _srvList. Finally, the _ruleCnt member is an integer value containing the number of rules stored in the _nuleList.

The member functions include a class constructor and destructor for creating and releasing the lists. Further, the GetServer( ) member function retrieves a server name based on the procedure name and its arguments.

As discussed above, the XRef data tables are constructed through the class instantiation and are linked together based on the procedure names and its type. The XRef Data Table constructor function calls the table update member function that initialized the table element counts. It also may call the update function to build the tables. The GetProcCnt( ), GetSrvCnt( ), and GetProcList( ) member functions are inline functions that return the number of stored procedures in the procedure list, the number of servers in the server list, and a pointer to the procedure list respectively. Table 2 illustrates the member functions associated with the XRef Data Table class in a preferred embodiment.

TABLE 2

XREF DATA TABLE CLASS FUNCTIONS

```
The object constructor may be as follows:
    XRefDataTbl::XRefDatatbl( )
        initialize the procedure, server, and rule counts to zero
        if(UpdateTbl(CS_CHAR *server, CS-CHAR *uid,
            CS_CHAR *pswd)!= CS_SUCCEED)
            exit out of the function
The UpdateTbl function represents the XRef data table update function
that builds the XRef data tables from the XRef Server.
    XRefDataTbl::UpdateTbl(CS-CHAR *server, CS._CHAR *uid,
    CS-CHAR *pswd);
    {
        Set up the client interface to the XRef Server
            This is a standard client library interface set up
        Run the stored procedure "lp_get_srv-cnt" to retrieve the
            number of servers stored in the database.
            if it fails, there is a problem with the XRef Table Data
        Run the stored procedure "lp_get_rule_cnt" to retrieve the
            number of rules stored in the database.
            if it fails, there is a problem with the XRef Table Data
        Run the stored procedure "lp_get_proc_cnt" to retrieve the
            number of procedures stored in the database.
            if it fails, there is a problem with the XRef Table Data
        Allocate sufficient memory to store the number of rows for the
        server list. Run the stored procedure "lp_get_srv_list" to
            retrieve the data from the SERVER_GROUP and
            SERVER tables.
        Allocate sufficient memory to store the number of rows for the
        rule list. Run the stored procedure "lp_get_rule_list" to
        retrieve the data from the
RULE-BOUNDARY and SERVER tables.
        Allocate sufficient memory to store the number of rows for the
        procedure list.
        Run the stored procedure "lp_get_proc_list" to retrieve the
data from the PROCEDURE table.
            Integrate the lists by calling the BldList( ) function
            Exit and clean up the client application
};
The Build List function builds the lists, such that the three XRef data
tables are interlinked to provide a quick access to the desired server name
based on the stored procedure issued by a user.
    XRefDataTbl::BldList( )
        For every row returned from "lp-get_proc_cnt' link the
            structure if procList->pType == GROUP
                sequentially search srvList for srvList->grpName ==
                    procList->grpName
                store first srvList element in procList->firstSrv
                assign procList->firstRule = NULL
                initialize first count to zero
                sequentially search srvList and count the number of
                    servers supporting the server group
                store the count of the number of server in
                    procList->firstCnt
                else if procList->pType == RULE
                    sequentially search ruleList for
                    srvList->ruleName==procList->ruleName
                store first ruleList element in procList->firstRule
                assign procList->firstSrv = NULL
                sequentially search ruleList and count the number of
                    rules supporting the server group
                store the count of the number of rules in
                procList->firstCnt
                    sequentially search server List for server name
                        assign server pointer to server list element
                else // procList->pType == SPECIFIC
                    sequentially search server list for server name
                        assign firstSrv to the server list element
                        assign NULL to firstRule
                        assign 1 to firstCnt
                        break out of for loop
};
The Run RPC function issues the command to the remote data server and
processes the results.
    XRefDataTbl::RunRpc(CS-CONNECTION *conptr,
    CS_CHAR *cmd, CS_INT cmdType)
{
    Allocate the command structure
    Initiate the command
```

TABLE 2-continued

XREF DATA TABLE CLASS FUNCTIONS

```
    Send the command
    Process the results based on the command type
        This functionality is specific to the type of command issued
    Drop the command structure
}
The get server function searches the stored procedure list for a particular
stored procedure and creates a server name class object to point to the first
server supporting that stored procedure.
CS_RETCODE
    XRefDataTbl::GetServer(char *procname, void **argList,
    SrvName *server)
{
    Perform a binary search of the procedure list for the current stored
    procedure if it fails to get an entry,
        return CS - FAIL;
    Create server name object server for the procName and argList
    Assign server name to return parameter
    Return CS_SUCCEED;
}
```

The DDS requires the Xref Data Table and Server Table information to operate in the IHOPS environment. The tables are used to locate the appropriate data server(s) to satisfy a client's stored procedure request. Additional stored procedures may continuously be added to the client's application to facilitate new and enhanced features in the IHOPS environment. These new stored procedures are included in the Xref server data table to complete the implementation of the features which, in turn, requires a reload for the DDS internal tables. Also, additional data servers and DDSs may be added to the IHOPS. New servers are added to the DDS data table as well as to the Xref server data table so as to include these servers in the DDS internal tables.

The next class to be discussed is the ClntUsrData class. The ClntUsrData class is used as a means of encapsulating information needed by a Client service thread in the DDS open server application. This class may be constructed in the connection handler and may be pointed to by the user data for the Client's internal client thread control structure. The data is encapsulated within self-describing data objects including the data itself and the type or format of the representation of the information. In this way it is unnecessary to access the related class descriptors or class definitions to retieve the required semantic information. Through encapsulation, the data may be retrieved easily within any of the handlers that a Client thread may enter. The ClntUsrData class of a preferred embodiment is: class ClntUser Data

```
{
private:
        FMT_CTL*    _fmtCTL;
        Ucon*       _ucon;
public:
        ClntUsrData(int    numSrvs,
                           LoginData & loginData,
                           CmdConPool*cmdConPoolPtr);
        ~ClntUsrData();
virtual Ucon*              GetUcon();         //inline
virtual FMT_CTL*GetFmtCtl();          //inline
}
```

The ClntUsrData class provides a repository for information related to a Client's user data which is stored and reused with the Client's thread properties. This class encapsulates format control information needed to process result sets in the "ALL" scenario and user connection objects that allow a Client to re-use remote server connections. There exists at least one ClntUsr Data class allocation for each client accessing the DDS.

The_fmtCtl member data variable contains encapsulated information employed by several functions when processing results for an "ALL" scenario in the DDS application. The_ucon member data variable is a user connection object that allows a DDS Client to reuse its remote server connections, saving the overhead of continually re-opening connections. It is an object that abstracts and organizes Client connections.

The ClntUsrData( ) only constructor uses its arguments to allocate the_ucon object. It also allocates and initializes a FMT_CTL structure. The~ClntUsrData( ) destructor deallocates _ucon and_fmtCtl which were allocated by the constructor. The GetFmtCtl( ) inline member function returns the private_fmtCtl data member and the GetUcon( ) inline member returns the private_ucon data member.

The TopRPCList class ranks the most used RPC's, calculating each RPC's average execution time and returning the name, number of executions, and the average execution time to the requester. This class is called from the rp_mon_rpc registered procedure and is invoked when the DDS Control Application submits a monitoring request. All of the processing for this class is invoked from the constructor; no other member functions need be called by the requrester. The inherited TopList member functions support the underlying ordering work. The TopRPCList class of a preferred embodiment is:

```
class TopRPCList:    public TopList
{
    protected:
        virtual    COMPARE_CD   CompareFunc(void *)
    public:
                                TopRPCList(SRV_PROC*srvProcPtr,
                                           ProcElement* rpcListPtr,
                                           CS_INT       rpcListSize,
                                           CS_INT       topListSize);
                                ~TopRPCList()   {}
};
```

The protected virtual function CompareFunc(void * item) provides a complete definition for the pure virtual function declared by TopList. This function compares the item >cumNumRuns against the_current ->cumNumRuns and returns a COMPARE_CD.

The TopRPCList (SRV_PROC * srvProcPtr, ProcElement * rpcListPtn, CS_INT rpcListSize, CS—INT topListSize) constructor builds a list of topListSize ranked by the frequency of executions of RPC's in the array pointed to by ipcListPtr. The RPC list is of size rpcListSize. The RPC list and its size are defmed iini the XrefDataTbl class for the DDS. Once this list is loaded, the member function steps through the list, returning results to the requester. Each row contains the rpc_name, the number of executions, and the average execution time for the RPC. The average execution time is calculated by dividing the cumSeconds by the cumNumRuns as stored in the ProcElement in the XRefl)ataTbl.

RPC Handler

The DDS of the present invention processes a majority of Client transactions through the RPC Handler which is now discussed. The DDS accepts Client stored procedure requests and first investigates the resident registered procedure list table to locate the RPC in question. If the RPC is found in the table, the procedure is executed locally. If the RPC is not found in the table, the DDS raises a RPC Handler event and relinquishes control to the handler routine.

The RPC Handler processes all Client stored procedure requests to determine which of the DUSs should service the request. The RPC Handler provides a semi-passthni capability for Client's transactions that require selection of specific servers that may support the Client's transactions. This results in a single result set from the specified server. The RPC Handler also supports stored procedure requests from Client applications that access several data servers at a time within the same group. This allows for multiple transactions to be processed simultaneously.

In semi-passthru mode, the system parses the incoming client RPC command request and the RPC command results are passed thru the intermediate DDS directly to the Addressability. The incoming Client server requests are parsed to identify the request and any parameters associated with the transactions. The command request and its parameters are used to identify the appropriate data server to best service the transaction.

Initially and upon a request for service from a Client, the user data (including username, password, etc.) regarding such Client is obtained. The DDS uses this information to set up a User Connection Object.

The RPC command name is then retrieved from the data stream as are the number of RPC parameters associated with the RPC command, and the RPC parameters if they exist. The RPC Handler then causes the appropriate Server name (s) for the remote procedure call to be determined. This is generally accomplished by getting the next server element. At this point, in a preferred embodiment of the invention, the RPC Monitoring functionality is instantiated so that the control with respect to transaction servicing may be optimized.

The DDS then determines if a connection to the selected server(s) exists. If so, the request is submitted to that server. If no connection exists, one is established.

If the request was an "ALL" request (i.e., a read from or order to all data servers ill the IHOP System) then the results from all data servers are received by the DDS as part of the RPC Handler process flow. Otherwise, for requests directed to single or a group of data servers, the results are transmitted to the Addressability server in passthlu mode through the DDS.

ALL, ANY, SPECIFIC

The present invention acts on various scenarios for efficiently allocating requests to data servers based upon the type of transaction involved. As will be discussed in further detail below, a "SPECIFIC" request corresponds to a Procedure Type = Server and an "ANY" or "ALL" request corresponds to a Procedure Type=Group.

The "ANY" scenario will be discussed in detail now. It is to be understood that some or all of the steps next discussed may be omitted and additional steps may be added while still remaining within the spirit of the invention. Initially, the transaction generator will issue an RPC request to the DDS. At this point the DDS will raise an RPC event which is handled by the RPC Handler functionality of the DDS. Next, the RPC counter is incremented to indicate that an active RPC is present in the DDS. The user data corresponding to the client thread properties then is obtained, and the user connection information is established.

Once the preliminary setup is accomplished, the RPC command and its arguments are retrieved from the client request data stream. The DDS then obtains the appropriate data server information based upon the RPC command issued by the client. If desired, the procedure list information is obtained from the data server information and is used to instantiate the RPC Monitor object to start the timing of the current RPC. The GetNext function then gets the next data server in the available server list based on the procedure type and, if applicable, its argument list. In the "ANY" scenario, the DTP code indicates that the client's stored procedure could be sent to ANY data server in the server list supporting the server group. The DDS randomly selects a data server name from the server list. Additionally, an automatic retry mechanism may be included, so that the DDS selects another server from the list of available servers in the event the DDS is unable to connect to the first server selection.

Next, the GetCmdCon function is called to get or make a connection to the selected data server. The SendRpcCmd function then sends the RPC command and its argument set, if any, to the data server. After processing by the selected DUSs, results are returned to the DDS. The GetSrvTyp function is then invoked and returns the DTP code back to the RPC Handler. The "ANY" scenario utilizes the pass through capabilities of the DDS Open Server to process the result set. Thus, the data stream returned from the data server may be sent to the Addressability server without disturbance. This is accomplished once the active command/connection object is obtained.

Once the results are sent to the Addressability server, the DDS may issue a send done final to the Client indicating that the data transfer is complete. The EndRPC function is then invoked to stop the timing of the current RPC. Next, the data server object is released and the active RPC count is decremented.

The "SPECIFIC" scenario, which is used to select a single, individual server follows the same process as described above with respect to the "ANY" scenario except that the "SPECIFIC" scenario specifies rule based procedures or specific server procedures. The rule based procedure scenario selects the appropriate data server based on the data distribution rules and boundaries while the specific server procedure scenario uses the server name associated with the stored procedure.

The "ALL" scenario, which calls for a transaction to be directed to all data servers supporting the group, is processed as follows. Again, it should be understood that some or all of the steps next discussed may be omitted and additional steps may be added while still remaining within the spirit of the invention. Initially, the Client transmits an RPC request to the DDS. At this point, the DDS will raise an RPC event which is handled by the RPC Handler finctionality of the DDS. Next, the RPC counter is incremented to indicate that an active RPC is present in the DDS. The user data corresponding to the Client thread properties then may be obtained, and the user connection information is set up.

Once the preliminary setup is accomplished, the RPC command and its arguments are retrieved from the Client request data stream. The DDS then obtains the appropriate data server information based upon the RPC command issued by the Client. If desired, the procedure list information is obtained from the data server information and is used to instantiate the RPC Monitor object to start the timing of the current RPC. The GetNext function then gets the next data server in the available server list based on the procedure type and, if applicable, its argument list. In the "ALL" scenario, the DTP code would indicate that the client's stored procedure is to be sent to ALL data servers in the server list supporting the server group. The GetNext, GetCmdCon and SendRpcCmd functions are iteratively called until the server list has been completely traversed.

The GetCmdCon function is called to get or make a connection to the selected data server. The SendRpcCmd function then sends the RPC command and its argument set, if any, to the data server. For every RPC command sent to the data servers, the SendRpcCmd function establishes an Open Client environment that sends the RPC message to the SQL servers. Results are returned from the data servers in a random order back to the Open Client environment in the RPC Handler. The RPC Open Client sends the results back to the DDS. The GetSrvTyp function is then invoked and returns the DTP code back to the RPC Handler and processes multiple result sets in this scenario. The active command/connection object is obtained and while there are active commands outstanding, the results are retrieved and sent to the Addressability server. The RPC Handler then sends a send done MORE indication to the DDS, sets the command/connection to inactive and sends the MORE indication to the Addressability server. The MORE indicator informs the Addressability server to wait for additional results. As results are sent to the Addressability server the connections are marked inactive to indicate that the results were retrieved from the data server.

Once all of the results are returned to the DDS, the DDS issues a send done final to the data server, and ultimately, to the Client indicating that the transaction is complete. The EndRPC function then is invoked to stop the timing of the current RPC. Next, the data server object is released, and the active RPC count is decremented.

Utility Functions

A set of utility functions, described below, have been developed to support the operations of the DDS.

Command Connection Pool Service

The CmdConPoolSrvc object provides a mechanism to close all connections that have met or exceeded a time out limit. The time out limit is the period of time this process sleeps which is a DDS Open Server configurable time threshold.

The CmdConPoolSrvc object does not have any input parameters.

The CmdConPoolSrvc object provides output information to the DDS Error Handler which is directed to standard error and/or the DDS log file.

The CmdConPoolSrvc object returns CS—SUC,CEED or CS—FAIL.

Free Parameter Memory

The FreeParamMem object frees any allocated memory associated with the Remote Procedure Call parameters passed by the Client application. This object first cheeks if any parameters exist and frees all the allocated memory.

The FreeParamMem object accepts the following input parameters:

paramCnt—An integer count of the number of parameters associated with the RPC Name.

fmtPtr—A pointer to a data format structure that will contain the format of the data received from the Client in the RPC Handler.

paramDataPtr—A pointer to an array of pointers that will contain the actual RPC command parameter values.

paramLenPtr—An integer pointer that contains the length of each of the parameter values.

indPtr—A small integer pointer that is require to hold the null indicator for each parameter supplied by the client process and is required to bind the local variables.

The FreeParamMem object does not output any information to standard output.

The FreeParamMem object does not return any values to the calling object.

Get RPC Command

The Get RPC command object is used in the RPC Handler and obtains the name of the client supplied Remote Procedure Call and the associated parameters, if any. If parameters exist, this object allocates memory for the local variables, binds the parameter to the local variables, and transfers the data from the TDS to the local variables.

The GetRpcCmd object accepts the following parameters:

srvProcPtr—Service thread pointer for the current Client thread. rpcNamePtr—A character string that points to the Client supplied stored procedure name.

paramCnt—An integer count of the number of parameters associated with the RPC Name.

fmtptr—A pointer to a data format structure that will contain the format of the data received from the Client in the RPC Handler.

paramDataPtr—A pointer to an array of pointers that will contain the actual RPC command parameter values.

paramiLenPtr—An integer pointer that contains the length of each of the parameter values.

indPtr—A small integer pointer that is require to hold the null indicator for each parameter supplied by the Client process and is required to bind the local variables.

All the input parameters, except for the service thread pointer, are passed to the GetRpcCmd by reference.

The GetRpcCmd object does not provide any output to the standard output. All data is returned to the calling object through the input parameters which are passed by reference.

The GetRpcCmd object returns CS—SUCCEED or CS—FAIL to the calling object.

Install Registered Procedures

The InstallRegProcs object is the single point of installation of all the registered procedures stored in the DDS Open Server application. The InstallRegProcs object defines and creates all the registered procedures and any associated parameters in the Open Server registered procedure list table. In a preferred embodiment, this object installs the following registered procedures, which are presented in connection with the discussion on registered procedures.

OsShutdown

SetFilter

SetLogFlag

MonLog

MonRpc

The InstallRegProcs object does not accept any input parameters.

The InstallRegProcs object does not provide any output to standard output.

The InstallRegProcs object returns CS—SUCCESS or CS—FAIL to the calling object.

Process Command Line Arguments

The ProcArgs object processes the DDS command line arguments whenever the DDS is started. The command line arguments are extensive, but they allow the user to dynamically control how the DDS is conFig.d on startup. The DDS argument list provides the ability to control at least the following parameters:

NETBUFSIZE is used to set the maximum size of the network I/O buffer to be used by the client connections. NUMREMBUF controls the window size used on server-to-server connections. It indicates the maximum number of packets that may be outstanding on a logical sub channel before an acknowledgment is required. NUMCONNECTIONS indicates the maximum number of physical network connections the Open Server application will accept.

NUMTHREADS specifies the maximum number of treads available to the DDS application.

LOGFLAG is a flag that directs the error message to either standard error, the log file or both.

NUMREMSITES indicates the maximum number of remote server site handlers that can be active at a given time.

STACKSIZE defines the size of the stack allocated for each thread.

SERVERNAME specifies the name of the DDS application.

The ProcArgs object accepts the following input parameters:

argc—An integer count of the number of arguments presented on the command line argv—An array of character string pointers that contain the actual input parameter values.

nonSybProps—An class object that is passed by reference to hold all the non Sybase Open Server properties.

The ProcArgs object provides a usage statement to standard error if an invalid argument is detected on the command line.

The ProcArgs object returns CS—SUCCEED or CS—FAIL.

Process Configuration

The ProcConfig object opens the dds—config.dat file and configure the DDS application with any of the specified properties and flags. The properties and flags are the same as the command line settable properties and flags. Also, if any command line properties and flags are specified when the DDS is started, the command line options override configuration file properties or flag settings. The ProcConfig object ignores properties or flags that are misspelled or missing any required argument. The ProcConfig object accepts the following input parameters:

ctxptr—A pointer to the context structure for the DDS Open Server application.

nonSybProps—A class object passed by reference to record any non Sybase Open

Server properties that need to be set in the DDS Open Server application.

This object outputs error information through the DDS Error Handler functionality to standard error and/or the Open Server log file.

The ProcConfig object returns CS—SUCCEED or CS—FAIL.

Send RPC Command

The Send RPC command object sends the RPC command and its parameters to the remote data server. This object constructs a character string that contains the database name and the RPC name and issues a Client command to the destination data server along with any associated RPC parameters.

The SendRpcCmd object accepts the following parameters:

cmdPtr—A pointer to the command structure, that is used to send commands to a server.

rpcNamePtr—A character string that contains the Client supplied RPC command name.

dbname—A character string that contains the name of the database that contains the RPC command.

paramDataPtr—A pointer to an array of pointers that will contain the actual RPC command parameter values.

fmtPtr—A pointer to a data format structure that will contain the format of the data received from the client in the RPC Handler.

paramCnt—An integer count of the number of parameters associated with the RPC Name.

paramLenPti—An integer pointer that contains the length of each of the parameter values.

indPtr—A small integer pointer that is require to hold the null indicator for each parameter supplied by the Client process and is required to bind the local variables.

The SendRpcCmd object does not provide any output to the standard output.

The SendRpcCmd object returns CS—SUCCEED or CS—FAIL to the calling object.

The SendRpcCmd object constructs an error message and sends the message to the DDS Error Handler.

Server Message Callback

The SeiverMsgCB object accepts the following input parameters:

ctxPtr—A pointer to the context structure for which the message occurred.

conPtr—A pointer to the connection structure for which the message occurred.

srvMsg—A pointer to the CS—SERVERMSG structure containing server message information.

The ServerMsgCB object provides an output message that is logged with the DDS Error Handler object that outputs the message to standard error and/or the Open Server log file, or both.

The ServerMsgCH object only returns CS—SUCCEED.

In addition to the above DDS utility functions, a set of general utility functions have been developed to support the general operations of the DDS application.

CONNECT SERVER

The connect server object establishes a connection to the specified data server using the login user id and password parameters. This object allocates a connection pointer structure for the specified context of the DDS, sets the connection properties for user name and password, and establishes the connection to the data server.

The ConnectServer object accepts the following input parameters:

ctxPtr—A pointer to the context structure.

conPtr—The address of a pointer of a newly allocated connection structure.

sqlsiv—A character string that contains the name of the data server to be connected to.

usrld—A character string that contains the Client users identification used to connect to the data server.

pswd—A character string that contains the Client password used to connect to the data server.

The ConnectServer object provides no information to standard output.

The ConnectServer object returns CS—SUCCEED or CS—FAIL.

Get User Information

The GetUserinfo object accesses the thread properties and extracts the user id and password associated with the internal thread control structure.

The GetUserlnfo object accepts the following input parameters:

srvProcPtr—A pointer to an internal thread control structure usrld—A character string pointer that will contain the user identification from the thread properties.

pswd—A character string pointer that will contain the user's password from the thread properties.

The GetUserlnfo object provides no information to standard output or the DDS Error Handler.

The GetUserlnfo object returns CS—SUCCEED or CS—FAIL.

Manage Format Pointer

The ManageFmtPtr object provides the capability to set and/or retrieve a pointer to the format array in the remote server control structure.

The ManageFmtPtr object accepts the following input parameters:

srvProcPtr—A pointer to the thread control structure action—An integer value that specifies whether to get the format pointer, set the format pointer, or clear and release all allocated format structures type—An integer value that indicate whether to process a regular row format pointer or a compute row format pointer.

computeld—an integer value that contains a compute identification of the format array which is returned to the calling object.

fmtCtlPtr—A pointer to the format control structure fmtPtrPtr—An address to a pointer to the data format structure.

The ManageFmtPtr provides no information to standard output or the DDS Error Handler.

The ManageFmtPtr returns CS—SUCCEED.

Pass Results

The PassResults object receives RPC command results from the data server and passes the data packets directly through to the requesting Client object without disturbing the TDS packet.

The PassResults object accepts the following input parameters:

srvProcPtr—A pointer to the thread control structure.

cmdPtr—A pointer to the command control structure.

The PassResults object provides no information to standard output or the DDS Error Handler.

The PassResults object returns CS—SUCCEED or CS—FAIL.

Process Status Message

The ProcStatusMsg object reads the return status code from a remote data server and returns the status to the client. The calling object is responsible for sending the serve send done to the client.

The ProcStatusMsg object accepts the following input parameters:

srvProcPtr—A pointer to the thread control structure.

cmdPtr—A pointer to the command control structure.

The ProcStatusMsg object provides no information to standard output or the DDS Error Handler.

The ProcStatusMsg object returns CS—SUCCEED or CS—FAIL.

Send Results

The SendResults object processes DUS(s) results that satisfy a client's request from one or more remote DUSs. The calling object is responsible for sending the Addressibility server the appropriate Serve MORE and the final Send Done to the Client and the Addressibility server depending on the completion level of the client request.

The SendResults object accepts the following input parameters:

srvProcPtr—A pointer to the thread control structure.

cmdPtr—A pointer to the command control structure.

cmdType—An integer representing the command type, CS_RPC_CMD.

fmtCtlPtr—A pointer to the format control structure.

The SendResults object provides no information to standard output or the DDS Error Handler.

The SendResults object returns an integer —1 when an error condition exists or the number of rows processed.

DDS Registered Procedures

Several registered procedures have been developed to support administrative functionality for the DDS Open Servers.

Open Server Shutdown Features

The shutdown registered procedure, OsShutdown, provides a system administration tool that gracefully shuts down an open server application. A password is obtained from the command line to shutdown the open server. The OsShutdown registered procedure checks for any active RPC requests running against the DDS and returns control back to the systems administrator without shutting down the Open Server.

An active RPC request is defined as a Client issuing an RPC request for service through a DDS.

If there are no active RPC requests, the OsShutdown registered procedure initiates the shut down of the specified DDS. The registered procedure accesses a globally defined DDS server table to obtain the valid password for the specified. DDS and validates the password against the SA provided password. If the password is valid, the registered procedure issues a stop event that shuts down the Open Server. If the password is invalid, a message is logged to the error handler and returns control to the SA without printing a message to standard output.

Upon receiving the shutdown request, the registered procedure locks out any additional client transaction connections into the DDS Open Server application.

Monitor Log Feature

The monitor log registered procedure provides a mechanism that allows a client application to monitor the error and informational data being displayed in the DDS. The registered procedure, rp—mon—log,—log, allows a Client application to make a request to a DDS Open Server to monitor the log file activity of the specified DDS. The registered procedure utilizes several error handler member functions to determine if any other user is monitoring the log activity, to register the requesting Client thread with exclusive access to the monitoring functionality and a means to relinquish control of the monitoring functionality. The registered procedure call requires a valid password for the DDS and a time slice (in seconds) to monitor log activity. The log monitoring functionality permits only a single Client thread to access the monitoring functionality at any given time and relinquishes control of the monitoring functionality when their time slice has expired. The Client application can interrupt the monitoring activity by dropping their connection to the DDS Open Server.

Monitor RPC Performance Registered Procedure

The monitor RPC performance registered procedure provides a mechanism whereby a client application may monitor RPC performance either near real-time or historically. At least two different types of monitoring may be initiated using SYBASE® RPC's.

The registered procedure achieves near realtime reporting of RPC execution times when the @rpcoption parameter is equal to the string "ALL" or is a string containing a list of RPC's to be monitored. "ALL" is the default behavior for @rpcoption, so it need not be passed as an argument. The procedure returns to the monitoring Client the RPC name, RPC Client spid, and the RPC's execution time for a duration of num—seconds. Because all of this RPC information is being passed to rp—mon rpc via a message queues, only one near realtime monitoring session may run at a time.

The actual processing of the RPC information for near real-time monitoring is performed by the global MonRPC-MsgQ object named G—monRPCMsgQ which is instantiated prior to the srv—runo for the DDS. The RPC handler instantiates a MonRPC object each time an RPC is being run, and a pointer to that object is what is put on the queue when the near real-time monitoring is active and the RPC is one being monitored. The activation and polling of the message queue, as well as the sending of results, is all performed by G—monRPCMsgQ→RunMsgQ().

The cumulative average monitor may be run by more than one monitoring client at a time because it merely parses and orders information contained in the global Xrefdatatbl procList. All this processing is performed by a TopRPCList object. This registered procedure ensures that the number of elements in the top list does not exceed the number of elements in the proclist so that no memory is wasted. All the processing needed to return result rows to the Client is contained in the TopRPCList object's member functions. The Client will receive rows containing the RPC name, the cumulative number of executions of the RPC, and the average execution time for the RPC.

The only argument to the rp—mon—rpcO function is the SRV—PROC*, which is needed by the G—monRPCMsgQ→RunMsgQ() for activating the message queue and ensuring only one monitor is polling the message queue at a time. Both G—monRPCMsgQ→RunMsgQ() and the TopRPCList constructor need the SRV—PROC* to send results and messages back to the monitoring client.

A set of data flat files is maintained to support the non-database related data needed by the DDS. A discussion of each of these files as well as their purpose and structure follows.

Data Server Name File Definition

The server name file, servers.dat, is used to store all of the available Data Server names that support the SMS. The DDS extracts the server names from this file and builds internal tables for quick delivery of server names to the requesting code. The server name data file contains three attributes, the Server Names, the system administrator's ID, and a password. Each type of server is separated by a Server Type identifier. The Server attributes and the Server Type identifier is logically grouped together within the file. The password attribute is used to shut down the Open Servers in a graceful manner.

DDS Configuration File Definition

The DDS Configuration file contains configuration information that is used by the open server to set the Open Server properties on the startup of the DDS Open Server. The configuration parameters are specified in the file.

Stored Procedure Requirements

The following stored procedures are required to retrieve the data from the Xref Server. The data returned is used to populate the appropriate Xref data tables.

---

Stored Procedure Name - LP_GET_PROC_LIST - Retrieves a list of procedure names and related information.
Logical Table Name - procedure_list
Location - XRef Server
Procedure Type - Group
Database - xref
Input Parameters - Nothing or a valid stored procedure name
Output Values - A list of the attributes of the store procedure(s)
Procedure Text - As follows:
    create procedure lp_get_proc_list@pname char(30) = "%"
    as

```
            begin
                select          procedure_name,
                                group_name,
                                procedure_type,
                                dtp_code,
                                argument_position,
                                rule_name,
                                server_name,
                                database_name
                        from        procedure_list
                        where       procedure_name like @pname
                        sort by     procedure_name
                end
```
- Stored Procedure Name - LP_GET_RULE_LIST - Retrieves a list of rule names and related information.
Logical Table Names - rule_boundary and server_list
Location - XRef Server
Procedure Type - Group
Database - xref
Input Parameters - Nothing or a valid rule name
Output Values - A list of the attributes of the store procedure(s)
Procedure Text - As follows:
```
    create procedure lp_get_rule_list @rule_name char(30) = "%"
    as
    begin
        select      rule_name,
                    low_value,
                    high_value,
                    r.server_name
            from            rule_boundary r, server_list s
            where           r.server_name = s.server_name
                    and
                            rule_name like @rule_name
            sort by         rule_name, low_value
    end
```
- Procedure Name - LP_GET_SEV_LIST - Retrieves a list of server names and related information.
Logical Table Name - server_list and server_group
Location - XRef Server
Procedure Type - Group
Database - xref
Input Parameters - Nothing or a valid stored procedure name
Output Values - A list of the attributes of the store procedure(s)
Procedure Text - As follows:
```
    create procedure lp_get_server_list @sname char(30) = "%"
    as
    begin
        select      server_name,
                    warm_server,
                    s.group_name
            from            server_list s, server_group sg
            where           s.group_name = sg.group_name
                    and
                            s.server_name like @sname
            sort by         s.group_name, s.server_name
    end
```
- LP_GET_PROC_COUNT - Retrieves a count of the number of procedures stored on the XRef Database.
Logical Table Name - procedure_list
Location - XRef Server
Procedure Type - Group
Database - xref
Input Parameters - Nothing
Output Values - A count of all the store procedures
Procedure Text - As follows:
```
    create procedure lp_get_proc_cnt
    as
    begin
        select      count(*)
        from        procedure_list
    end
```
- LP-GET_RULE_COUNT - Retrieves a count of the number of rules stored on the XREF Database.
Logical Table Name -server_list and rule_boundary
Location - XRef Server
Procedure Type - Group
Database - xref
Input Parameters - Nothing
Output Values - A count of all the rules
Procedure Text - As follows:
```
    create procedure lp_get_rule_count
    as
    begin
        select          count(*)
        from            rule_boundary r, server_list s
        where           r.server name = s.server_name
    end
```
- LP_GET_SERVER_COUNT - Retrieves a count of the number of servers stored on the XRef Database.
Logical Table Name - server_list and server_group
Location - XRef Server
Procedure Type - Group
Database - xref
Input Parameters - Nothing
Output Values - A count of all the servers
Procedure Text - As follows:
```
    create procedure lp_get_server_count
    as
    begin
        select          count(*)
        from            server_list s, server_group sg
        where           s.group_name = sg.group_name
    end
```
- LP_GET_SRVGRP-COUNT-Retrieves a count of the number of server groups stored on the XRef Database.
Logical Table Name - server-group
Location - XRef Server
Procedure Type - Group
Database - xref
Input Parameters - Nothing
Output Values - A count of all the server groups
Procedure Text - As follows:
```
    create procedure lp_get_srvgrp_count
    as
    begin
        select          count(*)
        from            server_group
    end
```

A method and system for achieving client or customer-site processing of Client transaction in a distributed database environment has been described in detail above. As a result of such description, the advantages of the present invention will be apparent to those skilled in the art. While the invention has been described in conjunction with preferred embodiments, it is evident that numerous alternatives, modifications, variations, and uses will be apparent to those skilled in the art in light of the foregoing description.

We claim:

1. A distributed database system for processing a client or customer-site initiated on-line database transaction comprising:

a transaction generator, which initiates at least one database transaction, including information identifying service location equipment and a desired product, and transmits said at least one transaction to a dispatcher means for tracking a geographic location of said generator, for routing each of said at least one transactions to a geographic system, and for queuing each of said at least one transactions within a queue;

transaction transfer means for retrieving said at least one transaction from said queue and transmiting said at least one transaction to interrogation server means;

wherein said server interrogation means for interrogating data extraction means, which extracts said information identifying said service location equipment and said product from said transaction, formulates an addressability change transaction, and transmits said change transaction to said server interrogation means; and wherein said server interrogation means transmit said change transaction to an addressability change means for identifying controller means for enabling and disabling said desired product, and for instructing said controller means to update the status of said product.

2. The system of claim 1, wherein said transaction generator comprises a local order RF transmitter for transmitting said client-site initiated on-line database transaction, a local order RF receiver-convertor for receiving said transaction and converting said transaction to a computer readable format, and a modem for data linking said transaction to said queue.

3. The system of claim 2, wherein said local order transmitter comprises a transaction keying and RF transmitting device and a transaction RF transmission relay device.

4. The system of claim 1, wherein said queue is a persistent queue.

5. The system of claim 1, wherein said server interrogation means includes a rules database controlling the interrogation of said data extraction means.

6. A distributed database system for processing a client or customer-site initiated on-line database transaction comprising:

a portable transaction generator, which initiates a database transaction, including information identifying service location equipment and a desired product, and transmits said transaction to a queue;

a client message server, which retrieves said transaction from said queue and transmits said transaction to a data directory server;

wherein said data directory server interrogates at least one of a plurality of dispatch utility servers to identify an available dispatch utility server and routes said transaction to said available dispatch utility server;

wherein said available dispatch utility server extracts said information identifying said service location equipment and said product from said transaction, formulates an addressability change transaction, and transmits said change transaction to said data directory server;

wherein said data directory server transmit said change transaction to an addressability open server; and said addressability open server identifies a controller, which controls enabling and disabling said desired product, and instructs said controller to update the status of said product.

7. The system of claim 6, wherein said transaction generator comprises a local order RF transmitter for transmitting said client-site initiated on-line database transaction, a local order RF receiver-convertor for receiving said transaction and converting said transaction to a computer readable format, and a modem for data linking said transaction to said queue.

8. The system of claim 7, wherein said local order transmitter comprises a transaction keying and RF transmitting device and a transaction RF transmission relay device.

9. The system of claim 6, wherein said queue is a persistent queue.

10. The system of claim 6, wherein said data directory server includes a rules database controlling the interrogation of said at least one of a plurality of dispatch utility servers by said data directory server to identify said available dispatch utility server.

11. The system of claim 6, wherein said transactions comprise remote procedure calls.

12. The system of claim 6, wherein said plurality of dispatch utility servers operate in parallel to process a plurality of said database transactions concurrently.

13. The system of claim 6, wherein said plurality of dispatch utility servers operate in parallel to formulate a plurality of said addressability change transactions concurrently.

14. The system of claim 6, further comprising a plurality of controllers operating in parallel to process a plurality of said database transactions concurrently.

15. The system of claim 6, further comprising a plurality of controllers whereby an appropriate addressability change remote procedure call is formulated based on said client-site equipment.

16. A method of processing client or customer-site initiated on-line data transactions comprising the steps of:

initiating a data transaction, including information identifying service location equipment and a desired product, at a service location and transmitting said transaction to a queue;

retrieving said transaction from said queue and transmitting said transaction to a data directory server;

interrogating at least one of a plurality of dispatch utility servers to identify an available dispatch utility server and routing said transaction to said available dispatch utility server;

extracting said information identifying said service location equipment and said product from said data transaction, formulating an addressability change transaction and transmitting said change transaction to an addressability open server; and identifying a controller, which controls enabling and disabling said desired product, and instructing said controller to enable or disable said product.

17. The method of claim 16, wherein said queue is a persistent queue.

18. The method of claim 16, further comprising the step of establishing rules whereby the interrogation of said at least one of a plurality of dispatch utility servers by said data directory server to identify said available dispatch utility server is controlled.

19. The method of claim 16, wherein said transactions comprise remote procedure calls.

20. The system of claim 16, wherein said plurality of dispatch utility servers operate in parallel to process a plurality of said database transactions concurrently.

21. The system of claim 16, wherein said plurality of dispatch utility servers operate in parallel to formulate a plurality of said addressability change transactions concurrently.

22. The system of claim 16, further comprising a plurality of controllers operating in parallel to process a plurality of said database transactions concurrently.

23. The system of claim 16, further comprising a plurality of controllers whereby an appropriate addressability change remote procedure call is formulated based on said client-site equipment.

* * * * *